(12) United States Patent
Howell

(10) Patent No.: US 6,784,838 B2
(45) Date of Patent: Aug. 31, 2004

(54) BEAMFORMER FOR MULTI-BEAM RECEIVE ANTENNA

(75) Inventor: James M. Howell, Woodstock, GA (US)

(73) Assignee: EMS Technologies, Inc., Norcross, GA (US)

(*) Notice: Subject to any disclaimer, the term of this patent is extended or adjusted under 35 U.S.C. 154(b) by 0 days.

(21) Appl. No.: 10/290,996

(22) Filed: Nov. 8, 2002

(65) Prior Publication Data
US 2003/0095067 A1 May 22, 2003

Related U.S. Application Data

(60) Provisional application No. 60/345,414, filed on Nov. 9, 2001.

(51) Int. Cl.[7] .................................. H01Q 3/00
(52) U.S. Cl. ..................... 342/377; 455/562.1
(58) Field of Search ................ 342/371, 372, 342/373, 377; 455/562.1

(56) References Cited

U.S. PATENT DOCUMENTS

| | | | |
|---|---|---|---|
| 4,060,806 A | | 11/1977 | Davies et al. |
| 4,217,587 A | | 8/1980 | Jacomini |
| 4,720,712 A | | 1/1988 | Brookner et al. |
| 4,901,307 A | | 2/1990 | Gilhousen et al. |
| 5,077,562 A | * | 12/1991 | Chang et al. ............ 342/368 |
| 5,541,607 A | * | 7/1996 | Reinhardt ................ 342/372 |
| 5,621,752 A | * | 4/1997 | Antonio et al. .......... 375/144 |
| 5,821,901 A | | 10/1998 | Zagrodnick et al. |
| 5,864,548 A | | 1/1999 | Liu |
| 5,953,325 A | | 9/1999 | Willars |
| 5,986,590 A | | 11/1999 | Smith et al. |
| 6,064,338 A | | 5/2000 | Kobayakawa et al. |
| 6,122,260 A | | 9/2000 | Liu et al. |
| 6,222,498 B1 | | 4/2001 | Ishii et al. |
| 6,232,921 B1 | | 5/2001 | Aiken et al. |
| 2002/0050946 A1 | * | 5/2002 | Chang et al. ............ 342/368 |

FOREIGN PATENT DOCUMENTS

| | | |
|---|---|---|
| EP | 0 939 452 A2 | 9/1999 |
| WO | WO 95/22210 | 8/1995 |
| WO | WO 01/22926 A1 | 4/2001 |

OTHER PUBLICATIONS

Lier, Erik et al, "An On–Board Integrated Beam Conditioning System for Active Phased Array Satellite Antennas," IEEE International Conf. on Phased Array Systems and Technology, May 2000, pp 509–512.*

* cited by examiner

Primary Examiner—Gregory C. Issing
(74) Attorney, Agent, or Firm—Michael J. Mehrman; Mehrman Law Office PC

(57) ABSTRACT

A phased array antenna system that is operative to simultaneously form multiple beams without requiring an undue amount of hardware. The system collects propagating energy with a number of antenna elements to form multiple beams, encodes the beams as the energy is collected, combines the encoded beams, and then decodes the combined signal to separate the beams. In this way, the beams can be formed with a single set of antenna hardware instead of requiring a multiplicity of antenna hardware, one for each beam. Frequency coding may be implemented by repeatedly applying a Doppler phase shift to each beam, and then using a Doppler filter to separate the beams. Alternatively, a code division multiplexing technique may be implemented by using a CDMA code generator to apply a code to each beam, and then using a CDMA filter to separate the beams.

35 Claims, 27 Drawing Sheets

$$B(i) = \boxed{\text{AE (1) COMPONENT}} + \boxed{\text{AE (2) COMPONENT}} + \cdots \boxed{\text{AE (n) COMPONENT}}$$

$$B(i) = \sum_{j=1}^{n} \text{AE (j) COMPONENT}$$

$$AE(j) = \boxed{\text{B(1) COMPONENT}} + \boxed{\text{B(2) COMPONENT}} + \cdots \boxed{\text{B(m) COMPONENT}}$$

$$AE(j) = \sum_{i=1}^{m} \text{B(i) COMPONENT}$$

$$B(i) = \sum_{j=1}^{n} a_{ij} e^{j\phi_{ij}}$$

16 BEAM EQUATION $$B(i) = \underbrace{a_{i1} e^{j\phi^o_{i1}}}_{AE(1)\ COMPONENT} + \underbrace{a_{i2} e^{j\phi^o_{i2}}}_{AE(2)\ COMPONENT} + \cdots \underbrace{a_{in} e^{j\phi^o_{in}}}_{AE(n)\ COMPONENT}$$

$$AE(j) = \sum_{i=1}^{m} a_{ij} e^{j\phi^o_{ij}}$$

18 ANTENNA ELEMENT EQUATION $$AE(j) = \underbrace{a_{1j} e^{j\phi^o_{1j}}}_{B(1)\ COMPONENT} + \underbrace{a_{2j} e^{j\phi^o_{1j}}}_{B(2)\ COMPONENT} + \cdots \underbrace{a_{mj} e^{j\phi^o_{1j}}}_{B(m)\ COMPONENT}$$

$$[a_{ij}\ \phi^o_{ij}] \quad \begin{array}{l} i = 1 \rightarrow m\ (BEAMS) \\ j = 1 \rightarrow n\ (ELEMENTS) \end{array}$$

BEAM NO. ↗   ↖ ELEMENT NO.

20 BEAM PARAMETERS $$
\begin{array}{llll}
a_{11}\ \phi^o_{11}\ ; & a_{21}\ \phi^o_{21}\ ; & \cdots & a_{m1}\ \phi^o_{m1} \quad \} \text{ELEMENT (1) PARAMETERS} \\
a_{12}\ \phi^o_{12}\ ; & a_{22}\ \phi^o_{22}\ ; & \cdots & a_{m2}\ \phi^o_{m2} \quad \} \text{ELEMENT (2) PARAMETERS} \\
\vdots & \vdots & & \vdots \\
a_{1n}\ \phi^o_{1n}\ ; & a_{2n}\ \phi^o_{21}\ ; & \cdots & a_{mn}\ \phi^o_{mn} \quad \} \text{ELEMENT (n) PARAMETERS}
\end{array}
$$

BEAM (1) PARAMETERS  BEAM (2) PARAMETERS  BEAM (m) PARAMETERS

*FIG. 7*

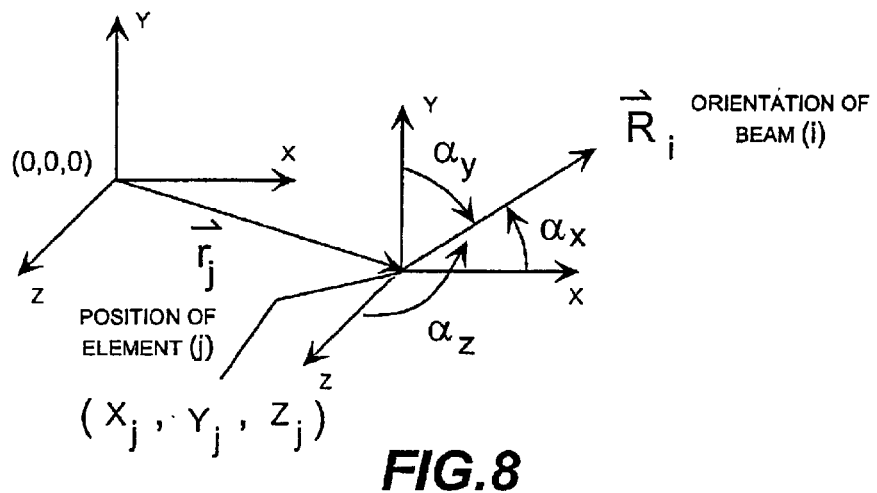

FIG.8

GAIN - $a_{ij}$ = ASSIGNED FOR DESIRED BEAM CHARACTERISTIC

INITIAL PHASE SHIFT - $\phi^o_{ij} = k\vec{r}_j \cdot \vec{R}_i$

CONSTANT - $k = \dfrac{2\pi}{\lambda}$ ← WAVELENGTH

ANTENNA ELEMENT POSITION - $\vec{r}_j = (X_j, Y_j, Z_j)$

BEAM ORIENTATION - $\vec{R}_i = (\cos\alpha_x, \cos\alpha_y, \cos\alpha_z)$

UNITY VECTOR - $|\vec{R}_i| = 1$ $$\phi^o_{ij} = k\vec{r}_j \cdot \vec{R}_i = \dfrac{2\pi}{\lambda}(X_j \cos\alpha_x, Y_j \cos\alpha_y, Z_j \cos\alpha_z)$$

FIG.9

Phase / Gain Control Signals $$\hat{a}_j(t_k) = \sqrt{I_j^2(t_k) + Q_j^2(t_k)} = \text{TOTAL GAIN}$$

$$\hat{\phi}_j(t_k) = \tan^{-1}\left(\frac{I_j(t_k)}{Q_j(t_k)}\right) = \text{TOTAL PHASE SHIFT}$$

$$I_j(t_k) = \sum_{i=1}^{m} a_{ij} \cos\left[\phi_{ij}^{\circ} + k\delta_i\right] = \text{SUM IN-PHASE BEAM COMPONENTS}$$

$$Q_j(t_k) = \sum_{i=1}^{m} a_{ij} \sin\left[\phi_{ij}^{\circ} + k\delta_i\right] = \text{SUM QUADRATURE BEAM COMPONENTS}$$

$$I_j(t_k) = a_{1j} \cos\left[\phi_{1j}^{\circ} + k\delta_1\right] + a_{2j} \cos\left[\phi_{2j}^{\circ} + k\delta_2\right] + \ldots a_{mj} \cos\left[\phi_{mj}^{\circ} + k\delta_m\right]$$

$$Q_j(t_k) = a_{1j} \sin\left[\phi_{1j}^{\circ} + k\delta_1\right] + a_{2j} \sin\left[\phi_{2j}^{\circ} + k\delta_2\right] + \ldots a_{mj} \sin\left[\phi_{mj}^{\circ} + k\delta_m\right]$$

$\delta_1, \delta_2, \ldots \delta_m$ = Doppler channels (phase shifts)

For j = 1 to n elements

*FIG. 15*

| Time | Element (1) | | Element (2) | | Element (n) | |
|---|---|---|---|---|---|---|
| | $\hat{a}_1$ | $\hat{\phi}_1$ | $\hat{a}_2$ | $\hat{\phi}_2$ | $\hat{a}_n$ | $\hat{\phi}_n$ |
| $t_0$ | $\hat{a}_1(t_0)$ | $\hat{\phi}_1(t_0)$ | $\hat{a}_2(t_0)$ | $\hat{\phi}_2(t_0)$ | $\hat{a}_n(t_0)$ | $\hat{\phi}_n(t_0)$ |
| $t_1$ | $\hat{a}_1(t_1)$ | $\hat{\phi}_1(t_1)$ | $\hat{a}_2(t_1)$ | $\hat{\phi}_2(t_1)$ | $\hat{a}_n(t_1)$ | $\hat{\phi}_n(t_1)$ |
| $t_2$ | $\hat{a}_1(t_2)$ | $\hat{\phi}_1(t_2)$ | $\hat{a}_2(t_2)$ | $\hat{\phi}_2(t_2)$ | $\hat{a}_n(t_2)$ | $\hat{\phi}_n(t_2)$ |
| $t_3$ | $\hat{a}_1(t_3)$ | $\hat{\phi}_1(t_3)$ | $\hat{a}_2(t_3)$ | $\hat{\phi}_2(t_3)$ | $\hat{a}_n(t_3)$ | $\hat{\phi}_n(t_3)$ |
| $t_4$ | $\hat{a}_1(t_4)$ | $\hat{\phi}_1(t_4)$ | $\hat{a}_2(t_4)$ | $\hat{\phi}_2(t_4)$ | $\hat{a}_n(t_4)$ | $\hat{\phi}_n(t_4)$ |
| $t_5$ | $\hat{a}_1(t_5)$ | $\hat{\phi}_1(t_5)$ | $\hat{a}_2(t_5)$ | $\hat{\phi}_2(t_5)$ | $\hat{a}_n(t_5)$ | $\hat{\phi}_n(t_5)$ |
| $t_x$ | $\hat{a}_1(t_x)$ | $\hat{\phi}_1(t_x)$ | $\hat{a}_2(t_x)$ | $\hat{\phi}_2(t_x)$ | $\hat{a}_n(t_x)$ | $\hat{\phi}_n(t_x)$ |

Control Signals for time ($t_0$):

For Antenna Element (1):

$$\hat{a}_1(t_0) = \sqrt{I_1^2(t_0) + Q_1^2(t_0)} \qquad \hat{\phi}_1(t_0) = \tan^{-1}\left(\frac{I_1(t_0)}{Q_1(t_0)}\right)$$

$$I_1(t_0) = \sum_{i=1}^{m} a_{i1} \cos\left[\phi_{i1}^\circ + 0\right] \qquad Q_1(t_0) = \sum_{i=1}^{m} a_{i1} \sin\left[\phi_{i1}^\circ + 0\right]$$

$$I_1(t_0) = a_{11} \cos\left[\phi_{11}^\circ + 0\right] + a_{21} \cos\left[\phi_{21}^\circ + 0\right] + \ldots a_{m1} \cos\left[\phi_{m1}^\circ + 0\right]$$

$$Q_1(t_0) = a_{11} \sin\left[\phi_{11}^\circ + 0\right] + a_{21} \sin\left[\phi_{21}^\circ + 0\right] + \ldots a_{m1} \sin\left[\phi_{m1}^\circ + 0\right]$$

For Antenna Element (2):

$$\hat{a}_2(t_0) = \sqrt{I_2^2(t_0) + Q_2^2(t_0)} \qquad \hat{\phi}_2(t_0) = \tan^{-1}\left(\frac{I_2(t_0)}{Q_2(t_0)}\right)$$

$$I_2(t_0) = \sum_{i=1}^{m} a_{i2} \cos\left[\phi_{i2}^\circ + 0\right] \qquad Q_2(t_0) = \sum_{i=1}^{m} a_{i2} \sin\left[\phi_{i2}^\circ + 0\right]$$

$$I_2(t_0) = a_{12} \cos\left[\phi_{12}^\circ + 0\right] + a_{22} \cos\left[\phi_{22}^\circ + 0\right] + \ldots a_{m2} \cos\left[\phi_{m2}^\circ + 0\right]$$

$$Q_2(t_0) = a_{12} \sin\left[\phi_{12}^\circ + 0\right] + a_{22} \sin\left[\phi_{22}^\circ + 0\right] + \ldots a_{m2} \sin\left[\phi_{m2}^\circ + 0\right]$$

For Antenna Element (n):

$$\hat{a}_n(t_0) = \sqrt{I_n^2(t_0) + Q_n^2(t_0)} \qquad \hat{\phi}_n(t_0) = \tan^{-1}\left(\frac{I_n(t_0)}{Q_n(t_0)}\right)$$

$$I_n(t_0) = \sum_{i=1}^{m} a_{in} \cos\left[\phi_{in}^\circ + 0\right] \qquad Q_n(t_0) = \sum_{i=1}^{m} a_{in} \sin\left[\phi_{in}^\circ + 0\right]$$

$$I_n(t_0) = a_{1n} \cos\left[\phi_{1n}^\circ + 0\right] + a_{2n} \cos\left[\phi_{2n}^\circ + 0\right] + \ldots a_{mn} \cos\left[\phi_{mn}^\circ + 0\right]$$

$$Q_n(t_0) = a_{1n} \sin\left[\phi_{1n}^\circ + 0\right] + a_{2n} \sin\left[\phi_{2n}^\circ + 0\right] + \ldots a_{mn} \sin\left[\phi_{mn}^\circ + 0\right]$$

FIG. 20

Control Signals for time ($t_1$):

For Antenna Element (1):

$$\hat{a}_1(t_1) = \sqrt{I_1^2(t_1) + Q_1^2(t_1)} \qquad \hat{\phi}_1(t_1) = \tan^{-1}\left(\frac{I_1(t_1)}{Q_1(t_1)}\right)$$

$$I_1(t_1) = \sum_{i=1}^{m} a_{i1} \cos\left[\phi_{i1}^{\circ} + \delta_i\right] \qquad Q_1(t_1) = \sum_{i=1}^{m} a_{i1} \sin\left[\phi_{i1}^{\circ} + \delta_i\right]$$

$$I_1(t_1) = a_{11} \cos\left[\phi_{11}^{\circ} + \delta_1\right] + a_{21} \cos\left[\phi_{21}^{\circ} + \delta_2\right] + \ldots a_{m1} \cos\left[\phi_{m1}^{\circ} + \delta_m\right]$$

$$Q_1(t_1) = a_{11} \sin\left[\phi_{11}^{\circ} + \delta_1\right] + a_{21} \sin\left[\phi_{21}^{\circ} + \delta_2\right] + \ldots a_{m1} \sin\left[\phi_{m1}^{\circ} + \delta_m\right]$$

For Antenna Element (2):

$$\hat{a}_2(t_1) = \sqrt{I_2^2(t_1) + Q_2^2(t_1)} \qquad \hat{\phi}_2(t_1) = \tan^{-1}\left(\frac{I_2(t_1)}{Q_2(t_1)}\right)$$

$$I_2(t_1) = \sum_{i=1}^{m} a_{i2} \cos\left[\phi_{i2}^{\circ} + \delta_i\right] \qquad Q_2(t_1) = \sum_{i=1}^{m} a_{i2} \sin\left[\phi_{i2}^{\circ} + \delta_i\right]$$

$$I_2(t_1) = a_{12} \cos\left[\phi_{12}^{\circ} + \delta_1\right] + a_{22} \cos\left[\phi_{22}^{\circ} + \delta_2\right] + \ldots a_{m2} \cos\left[\phi_{m2}^{\circ} + \delta_m\right]$$

$$Q_2(t_1) = a_{12} \sin\left[\phi_{12}^{\circ} + \delta_1\right] + a_{22} \sin\left[\phi_{22}^{\circ} + \delta_2\right] + \ldots a_{m2} \sin\left[\phi_{m2}^{\circ} + \delta_m\right]$$

For Antenna Element (n):

$$\hat{a}_n(t_1) = \sqrt{I_n^2(t_1) + Q_n^2(t_1)} \qquad \hat{\phi}_n(t_1) = \tan^{-1}\left(\frac{I_n(t_1)}{Qn(t_1)}\right)$$

$$I_n(t_1) = \sum_{i=1}^{m} a_{in} \cos\left[\phi_{in}^{\circ} + \delta_i\right] \qquad Q_n(t_1) = \sum_{i=1}^{m} a_{in} \sin\left[\phi_{in}^{\circ} + \delta_i\right]$$

$$I_n(t_1) = a_{1n} \cos\left[\phi_{1n}^{\circ} + \delta_1\right] + a_{2n} \cos\left[\phi_{2n}^{\circ} + \delta_2\right] + \ldots a_{mn} \cos\left[\phi_{mn}^{\circ} + \delta_m\right]$$

$$Q_n(t_1) = a_{1n} \sin\left[\phi_{1n}^{\circ} + \delta_1\right] + a_{2n} \sin\left[\phi_{2n}^{\circ} + \delta_2\right] + \ldots a_{mn} \sin\left[\phi_{mn}^{\circ} + \delta_m\right]$$

FIG. 21

Control Signals for time ($t_2$):

For Antenna Element (1):

$$\hat{a}_1(t_2) = \sqrt{I_1^2(t_2) + Q_1^2(t_2)} \qquad \hat{\phi}_1(t_2) = \tan^{-1}\left(\frac{I_1(t_2)}{Q_1(t_2)}\right)$$

$$I_1(t_2) = \sum_{i=1}^{m} a_{i1} \cos\left[\phi_{i1}^o + 2\delta_i\right] \qquad Q_1(t_2) = \sum_{i=1}^{m} a_{i1} \sin\left[\phi_{i1}^o + 2\delta_i\right]$$

$$I_1(t_2) = a_{11} \cos\left[\phi_{11}^o + 2\delta_1\right] + a_{21} \cos\left[\phi_{21}^o + 2\delta_2\right] + \ldots a_{m1} \cos\left[\phi_{m1}^o + 2\delta_m\right]$$

$$Q_1(t_2) = a_{11} \sin\left[\phi_{11}^o + 2\delta_1\right] + a_{21} \sin\left[\phi_{21}^o + 2\delta_2\right] + \ldots a_{m1} \sin\left[\phi_{m1}^o + 2\delta_m\right]$$

For Antenna Element (2):

$$\hat{a}_2(t_2) = \sqrt{I_2^2(t_2) + Q_2^2(t_2)} \qquad \hat{\phi}_2(t_2) = \tan^{-1}\left(\frac{I_2(t_2)}{Q_2(t_2)}\right)$$

$$I_2(t_2) = \sum_{i=1}^{m} a_{i2} \cos\left[\phi_{i2}^o + 2\delta_i\right] \qquad Q_2(t_2) = \sum_{i=1}^{m} a_{i2} \sin\left[\phi_{i2}^o + 2\delta_i\right]$$

$$I_2(t_2) = a_{12} \cos\left[\phi_{12}^o + 2\delta_1\right] + a_{22} \cos\left[\phi_{22}^o + 2\delta_2\right] + \ldots a_{m2} \cos\left[\phi_{m2}^o + 2\delta_m\right]$$

$$Q_2(t_2) = a_{12} \sin\left[\phi_{12}^o + 2\delta_1\right] + a_{22} \sin\left[\phi_{22}^o + 2\delta_2\right] + \ldots a_{m2} \sin\left[\phi_{m2}^o + 2\delta_m\right]$$

For Antenna Element (n):

$$\hat{a}_n(t_2) = \sqrt{I_n^2(t_2) + Q_n^2(t_2)} \qquad \hat{\phi}_n(t_2) = \tan^{-1}\left(\frac{I_n(t_2)}{Q_n(t_2)}\right)$$

$$I_n(t_2) = \sum_{i=1}^{m} a_{in} \cos\left[\phi_{in}^o + 2\delta_i\right] \qquad Q_n(t_2) = \sum_{i=1}^{m} a_{in} \sin\left[\phi_{in}^o + 2\delta_i\right]$$

$$I_n(t_2) = a_{1n} \cos\left[\phi_{1n}^o + 2\delta_1\right] + a_{2n} \cos\left[\phi_{2n}^o + 2\delta_2\right] + \ldots a_{mn} \cos\left[\phi_{mn}^o + 2\delta_m\right]$$

$$Q_n(t_2) = a_{1n} \sin\left[\phi_{1n}^o + 2\delta_1\right] + a_{2n} \sin\left[\phi_{2n}^o + 2\delta_2\right] + \ldots a_{mn} \sin\left[\phi_{mn}^o + 2\delta_m\right]$$

*FIG. 22*

Control Signals for time ($t_3$):

For Antenna Element (1):

$$\hat{a}_1(t_3) = \sqrt{I_1^2(t_3) + Q_1^2(t_3)} \qquad \hat{\phi}_1(t_3) = \tan^{-1}\left(\frac{I_1(t_3)}{Q_1(t_3)}\right)$$

$$I_1(t_3) = \sum_{i=1}^{m} a_{i1} \cos\left[\phi_{i1}^\circ + 3\delta_i\right] \qquad Q_1(t_3) = \sum_{i=1}^{m} a_{i1} \sin\left[\phi_{i1}^\circ + 3\delta_i\right]$$

$$I_1(t_3) = a_{11} \cos\left[\phi_{11}^\circ + 3\delta_1\right] + a_{21} \cos\left[\phi_{21}^\circ + 3\delta_2\right] + \ldots a_{m1} \cos\left[\phi_{m1}^\circ + 3\delta_m\right]$$

$$Q_1(t_3) = a_{11} \sin\left[\phi_{11}^\circ + 3\delta_1\right] + a_{21} \sin\left[\phi_{21}^\circ + 3\delta_2\right] + \ldots a_{m1} \sin\left[\phi_{m1}^\circ + 3\delta_m\right]$$

For Antenna Element (2):

$$\hat{a}_2(t_3) = \sqrt{I_2^2(t_3) + Q_2^2(t_3)} \qquad \hat{\phi}_2(t_3) = \tan^{-1}\left(\frac{I_2(t_3)}{Q_2(t_3)}\right)$$

$$I_2(t_3) = \sum_{i=1}^{m} a_{i2} \cos\left[\phi_{i2}^\circ + 3\delta_i\right] \qquad Q_2(t_3) = \sum_{i=1}^{m} a_{i2} \sin\left[\phi_{i2}^\circ + 3\delta_i\right]$$

$$I_2(t_3) = a_{12} \cos\left[\phi_{12}^\circ + 3\delta_1\right] + a_{22} \cos\left[\phi_{22}^\circ + 3\delta_2\right] + \ldots a_{m2} \cos\left[\phi_{m2}^\circ + 3\delta_m\right]$$

$$Q_2(t_3) = a_{12} \sin\left[\phi_{12}^\circ + 3\delta_1\right] + a_{22} \sin\left[\phi_{22}^\circ + 3\delta_2\right] + \ldots a_{m2} \sin\left[\phi_{m2}^\circ + 3\delta_m\right]$$

For Antenna Element (n):

$$\hat{a}_n(t_3) = \sqrt{I_n^2(t_3) + Q_n^2(t_3)} \qquad \hat{\phi}_n(t_3) = \tan^{-1}\left(\frac{I_n(t_3)}{Qn(t_3)}\right)$$

$$I_n(t_3) = \sum_{i=1}^{m} a_{in} \cos\left[\phi_{in}^\circ + 3\delta_i\right] \qquad Q_n(t_3) = \sum_{i=1}^{m} a_{in} \sin\left[\phi_{in}^\circ + 3\delta_i\right]$$

$$I_n(t_3) = a_{1n} \cos\left[\phi_{1n}^\circ + 3\delta_1\right] + a_{2n} \cos\left[\phi_{2n}^\circ + 3\delta_2\right] + \ldots a_{mn} \cos\left[\phi_{mn}^\circ + 3\delta_m\right]$$

$$Q_n(t_3) = a_{1n} \sin\left[\phi_{1n}^\circ + 3\delta_1\right] + a_{2n} \sin\left[\phi_{2n}^\circ + 3\delta_2\right] + \ldots a_{mn} \sin\left[\phi_{mn}^\circ + 3\delta_m\right]$$

*FIG. 23*

Control Signals for time ($t_x$):

For Antenna Element (1):

$$\hat{a}_1(t_x) = \sqrt{I_1^2(t_x) + Q_1^2(t_x)} \qquad \hat{\phi}_1(t_x) = \tan^{-1}\left(\frac{I_1(t_x)}{Q_1(t_x)}\right)$$

$$I_1(t_x) = \sum_{i=1}^{m} a_{i1} \cos\left[\phi_{i1}^\circ + x\delta_i\right] \qquad Q_1(t_x) = \sum_{i=1}^{m} a_{i1} \sin\left[\phi_{i1}^\circ + x\delta_i\right]$$

$$I_1(t_x) = a_{11} \cos\left[\phi_{11}^\circ + x\delta_1\right] + a_{21} \cos\left[\phi_{21}^\circ + x\delta_2\right] + \ldots a_{m1} \cos\left[\phi_{m1}^\circ + x\delta_m\right]$$

$$Q_1(t_x) = a_{11} \sin\left[\phi_{11}^\circ + x\delta\right] + a_{21} \sin\left[\phi_{21}^\circ + x\delta\right] + \ldots a_{m1} \sin\left[\phi_{m1}^\circ + x\delta\right]$$

For Antenna Element (2):

$$\hat{a}_2(t_x) = \sqrt{I_2^2(t_x) + Q_2^2(t_x)} \qquad \hat{\phi}_2(t_x) = \tan^{-1}\left(\frac{I_2(t_x)}{Q_2(t_x)}\right)$$

$$I_2(t_x) = \sum_{i=1}^{m} a_{i2} \cos\left[\phi_{i2}^\circ + x\delta_i\right] \qquad Q_2(t_x) = \sum_{i=1}^{m} a_{i2} \sin\left[\phi_{i2}^\circ + x\delta_i\right]$$

$$I_2(t_x) = a_{12} \cos\left[\phi_{12}^\circ + x\delta_1\right] + a_{22} \cos\left[\phi_{22}^\circ + x\delta_2\right] + \ldots a_{m2} \cos\left[\phi_{m2}^\circ + x\delta_m\right]$$

$$Q_2(t_x) = a_{12} \sin\left[\phi_{12}^\circ + x\delta_1\right] + a_{22} \sin\left[\phi_{22}^\circ + x\delta_2\right] + \ldots a_{m2} \sin\left[\phi_{m2}^\circ + x\delta_m\right]$$

For Antenna Element (n):

$$\hat{a}_n(t_x) = \sqrt{I_n^2(t_x) + Q_n^2(t_x)} \qquad \hat{\phi}_n(t_x) = \tan^{-1}\left(\frac{I_n(t_x)}{Q_n(t_x)}\right)$$

$$I_n(t_x) = \sum_{i=1}^{m} a_{in} \cos\left[\phi_{in}^\circ + x\delta_i\right] \qquad Q_n(t_x) = \sum_{i=1}^{m} a_{in} \sin\left[\phi_{in}^\circ + x\delta_i\right]$$

$$I_n(t_x) = a_{1n} \cos\left[\phi_{1n}^\circ + x\delta_1\right] + a_{2n} \cos\left[\phi_{2n}^\circ + x\delta_2\right] + \ldots a_{mn} \cos\left[\phi_{mn}^\circ + x\delta_m\right]$$

$$Q_n(t_x) = a_{1n} \sin\left[\phi_{1n}^\circ + x\delta_1\right] + a_{2n} \sin\left[\phi_{2n}^\circ + x\delta_2\right] + \ldots a_{mn} \sin\left[\phi_{mn}^\circ + x\delta_m\right]$$

FIG. 24

| Time | Element (1) | | | | Element (2) | | | | Element (n) | | |
|---|---|---|---|---|---|---|---|---|---|---|---|
| | Beam (1) | Beam (2) | ... | Beam (m) | Beam (1) | Beam (2) | ... | Beam (m) | Beam (1) | Beam (2) | ... Beam (m) |
| $t_0$ | $\phi^\circ_{11} + 0$ | $\phi^\circ_{21} + 0$ | | $\phi^\circ_{m1} + 0$ | $\phi^\circ_{12} + 0$ | $\phi^\circ_{22} + 0$ | | $\phi^\circ_{m2} + 0$ | $\phi^\circ_{1n} + 0$ | $\phi^\circ_{2n} + 0$ | $\phi^\circ_{mn} + 0$ |
| $t_1$ | $\phi^\circ_{11} + \delta_1$ | $\phi^\circ_{21} + \delta_2$ | | $\phi^\circ_{m1} + \delta_m$ | $\phi^\circ_{12} + \delta_1$ | $\phi^\circ_{22} + \delta_2$ | | $\phi^\circ_{m2} + \delta_m$ | $\phi^\circ_{1n} + \delta_1$ | $\phi^\circ_{2n} + \delta_2$ | $\phi^\circ_{mn} + \delta_m$ |
| $t_2$ | $\phi^\circ_{11} + 2\delta_1$ | $\phi^\circ_{21} + 2\delta_2$ | | $\phi^\circ_{m1} + 2\delta_m$ | $\phi^\circ_{12} + 2\delta_1$ | $\phi^\circ_{22} + 2\delta_2$ | | $\phi^\circ_{m2} + 2\delta_m$ | $\phi^\circ_{1n} + 2\delta_1$ | $\phi^\circ_{2n} + 2\delta_2$ | $\phi^\circ_{mn} + 2\delta_m$ |
| $t_3$ | $\phi^\circ_{11} + 3\delta_1$ | $\phi^\circ_{21} + 3\delta_2$ | | $\phi^\circ_{m1} + 3\delta_m$ | $\phi^\circ_{12} + 3\delta_1$ | $\phi^\circ_{22} + 3\delta_2$ | | $\phi^\circ_{m2} + 3\delta_m$ | $\phi^\circ_{1n} + 3\delta_1$ | $\phi^\circ_{2n} + 3\delta_2$ | $\phi^\circ_{mn} + 3\delta_m$ |
| $t_4$ | $\phi^\circ_{11} + 4\delta_1$ | $\phi^\circ_{21} + 4\delta_2$ | | $\phi^\circ_{m1} + 4\delta_m$ | $\phi^\circ_{12} + 4\delta_1$ | $\phi^\circ_{22} + 4\delta_2$ | | $\phi^\circ_{m2} + 4\delta_m$ | $\phi^\circ_{1n} + 4\delta_1$ | $\phi^\circ_{2n} + 4\delta_2$ | $\phi^\circ_{mn} + 4\delta_m$ |
| $t_5$ | $\phi^\circ_{11} + 5\delta_1$ | $\phi^\circ_{21} + 5\delta_2$ | | $\phi^\circ_{m1} + 5\delta_m$ | $\phi^\circ_{12} + 5\delta_1$ | $\phi^\circ_{22} + 5\delta_2$ | | $\phi^\circ_{m2} + 5\delta_m$ | $\phi^\circ_{1n} + 5\delta_1$ | $\phi^\circ_{2n} + 5\delta_2$ | $\phi^\circ_{mn} + 5\delta_m$ |
| $t_x$ | $\phi^\circ_{11} + x\delta_1$ | $\phi^\circ_{21} + x\delta_2$ | | $\phi^\circ_{m1} + x\delta_m$ | $\phi^\circ_{12} + x\delta_1$ | $\phi^\circ_{22} + x\delta_2$ | | $\phi^\circ_{m2} + x\delta_m$ | $\phi^\circ_{1n} + x\delta_1$ | $\phi^\circ_{2n} + x\delta_2$ | $\phi^\circ_{mn} + x\delta_m$ |

2500

Corresponds to convention shown on FIGS. 15 and 20-24

Fig. 25

| Time | Element (1) ||| Element (2) ||| Element (n) |||
|---|---|---|---|---|---|---|---|---|---|
| | Beam (1) | Beam (2) | Beam (3) | Beam (1) | Beam (2) | Beam (3) | Beam (1) | Beam (2) | Beam (m) |
| $t_0$ | $\phi^\circ_{11} + 0$ | $\phi^\circ_{21} + 0$ | $\phi^\circ_{m1} + 0$ | $\phi^\circ_{12} + 0$ | $\phi^\circ_{22} + 0$ | $\phi^\circ_{m2} + 0$ | $\phi^\circ_{1n} + 0$ | $\phi^\circ_{2n} + 0$ | $\phi^\circ_{mn} + 0$ |
| $t_1$ | $\phi^\circ_{11} + 0$ | $\phi^\circ_{21} + \Delta$ | $\phi^\circ_{m1} + 2\Delta$ | $\phi^\circ_{12} + 0$ | $\phi^\circ_{22} + \Delta$ | $\phi^\circ_{m2} + 2\Delta$ | $\phi^\circ_{1n} + 0$ | $\phi^\circ_{2n} + \Delta$ | $\phi^\circ_{mn} + 2\Delta$ |
| $t_2$ | $\phi^\circ_{11} + 0$ | $\phi^\circ_{21} + 2\Delta$ | $\phi^\circ_{m1} + 4\Delta$ | $\phi^\circ_{12} + 0$ | $\phi^\circ_{22} + 2\Delta$ | $\phi^\circ_{m2} + 4\Delta$ | $\phi^\circ_{1n} + 0$ | $\phi^\circ_{2n} + 2\Delta$ | $\phi^\circ_{mn} + 4\Delta$ |
| $t_3$ | $\phi^\circ_{11} + 0$ | $\phi^\circ_{21} + 3\Delta$ | $\phi^\circ_{m1} + 6\Delta$ | $\phi^\circ_{12} + 0$ | $\phi^\circ_{22} + 3\Delta$ | $\phi^\circ_{m2} + 6\Delta$ | $\phi^\circ_{1n} + 0$ | $\phi^\circ_{2n} + 3\Delta$ | $\phi^\circ_{mn} + 6\Delta$ |
| $t_4$ | $\phi^\circ_{11} + 0$ | $\phi^\circ_{21} + 4\Delta$ | $\phi^\circ_{m1} + 8\Delta$ | $\phi^\circ_{12} + 0$ | $\phi^\circ_{22} + 4\Delta$ | $\phi^\circ_{m2} + 8\Delta$ | $\phi^\circ_{1n} + 0$ | $\phi^\circ_{2n} + 4\Delta$ | $\phi^\circ_{mn} + 8\Delta$ |
| $t_5$ | $\phi^\circ_{11} + 0$ | $\phi^\circ_{21} + 5\Delta$ | $\phi^\circ_{m1} + 10\Delta$ | $\phi^\circ_{12} + 0$ | $\phi^\circ_{22} + 5\Delta$ | $\phi^\circ_{m2} + 10\Delta$ | $\phi^\circ_{1n} + 0$ | $\phi^\circ_{2n} + 5\Delta$ | $\phi^\circ_{mn} + 10\Delta$ |
| $t_x$ | $\phi^\circ_{11} + 0$ | $\phi^\circ_{21} + x\Delta$ | $\phi^\circ_{m1} + 2x\Delta$ | $\phi^\circ_{12} + 0$ | $\phi^\circ_{22} + x\Delta$ | $\phi^\circ_{m2} + 2x\Delta$ | $\phi^\circ_{1n} + 0$ | $\phi^\circ_{2n} + x\Delta$ | $\phi^\circ_{mn} + 2x\Delta$ |

Let m=3, $\delta_1 = 0$; $\delta_m = \Delta$ (a constant)

*Fig. 26*

BEAMFORMER FOR MULTI-BEAM RECEIVE ANTENNA

CROSS-REFERENCE TO RELATED APPLICATIONS

This application claims priority to commonly-owned U.S. Provisional Patent Application Serial No. 60/345,414 entitled "Virtual Beamformer For Radar Applications" filed Nov. 9, 2001.

TECHNICAL FIELD

The present invention relates to phased array antenna systems, such as radar, and more particularly relates to a beam former that generates encoded control signals that drive the antenna elements of a phased array to receive multiple beams while allowing a filter to detect coding parameters contained in the control signals to separate the multiple beams from a combined signal received from the antenna.

BACKGROUND OF THE INVENTION

Phased array antenna systems, such as those used for radar systems, take advantage of the phase differential that occurs according to the direction of coherent propagating energy. For example, in a simple array of two closely spaced antenna elements lying in a plane and both facing forward, an incoming signal coming straight from the forward direction would be received at the same time at both elements, resulting in signals at each element having the same phase, which are referred to as "in-phase." But if the energy approaches the elements at an angle, the two elements receive the energy at different times, resulting in a phase differential or "shift" between the two signals. This is similar to ocean waves arriving at a beach. If the wave comes straight in to shore, the wave washes upon the beach at the same time along the beach. If the wave is coming in at an angle relative to the beach, however, it arrives first in one spot and then progressively arrives down the beach at later times.

A similar phenomenon is at work in phased array antenna systems. Since the propagating electromagnetic energy reaches the nearest antenna element first, the direction of the incoming energy can be determined by detecting the phase differential. Similarly, a directional "beam" may be formed by collecting the signals from the antenna elements with coordinated phase delays, which causes the received energy to add up constructively in a desired beam direction while partially or completely canceling out in all other directions. It is common to steer a coherent beam created in this manner by controlling programmable phase and gain control devices at each antenna element in a coordinated manner. For example, a single beam formed by a phased array may be controlled to periodically sweep across the antenna's angular coverage, to track a detected target, to sweep or track while avoiding a known signal, or to achieve other objectives. This conventional single-beam steering system uses a single controllable phase and gain control device for each antenna element, a single beam forming combiner, and a beam steering computer to create and control the beam.

It is also conventional to use a phased array antenna system to simultaneously receive multiple beams having different pointing directions. For example, rather than steering one beam to sweep across the antenna's angular coverage, as described above, the phased array may be controlled to divide the antenna's angular coverage into multiple beams to monitor the entire operational volume simultaneously. This may be thought of as causing the antenna to "look" in many different directions at the same time. This is accomplished conventionally by dividing the signal received at each antenna element into separate channels using separate phase and gain control devices at each antenna element for each desired beam. In addition, a separate beam forming combiner is typically required to assemble each beam from the signals received for the corresponding beam from each antenna element. In other words, the multiple beams are conventionally formed by providing separate sets of antenna hardware for each beam, which generally multiplies the required number of antenna hardware elements, including phase and gain control devices and beam forming combiners, by the number of desired beams. This may be considered a "brute force" design technique due to the heavy dependence on antenna hardware to generate the desired beams.

In a typical target acquisition radar, for example, the phased array antenna may include 1,000 antenna elements that are used to form 100 independently controlled beams. In this case, each of the 1,000 antenna elements requires 100 different simultaneous phase and gain settings to form the 100 different beams. This is conventionally accomplished by providing each of the 1,000 antenna elements with 100 different phase and gain devices, one corresponding to each beam. The signals for each beam received from the various antenna elements are then combined in a separate beam forming combiner to create 100 different beams, each having a component received from each antenna element. This conventional approach requires 100,000 phase and gain devices and 100 beam forming combiners, which typically results in a system that is exorbitantly expensive, complex to construct, large in size, and heavy. Any one or more of these penalties may be critical for a particular application.

To save against these penalties, the beams may be set in advance by fixed phase and gain control devices, which cannot be changed without changing the antenna hardware. This option, of course, limits the flexibility of the system. Alternatively, the antenna may include programmable control hardware that can be reprogrammed to create different beam sets, which may involve defining the number of beams, their pointing directions, and the shapes of their antenna patterns. However, this approach may be prohibitively expensive because it requires separate programmable phase and gain control devices for each antenna element, for each desired beam. For the antenna in the previous example, this would require 100,000 programmable phase and gain control devices. The number of beams or antenna elements may be reduced, but performance is sacrificed with these alternatives.

In addition, a conventional single-beam radar system typically includes a single phase and gain device for each antenna element, a single beam forming combiner, and a Doppler filter. In many such cases, the beam forming network produces a sum and two difference beams for mono-pulse operation. Upgrading such a system to receive multiple beams in the conventional manner, as described above, would require multiplying the number of phase and gain control devices at each antenna element by the number of desired beams, and adding a separate beam forming combiner and Doppler filter for each desired beam. Again, size, weight or cost constraints may ultimately limit the number of beams that can be accommodated in the upgrade. The design penalties would be minimized, of course, if multiple beams could be produced while requiring only a single phase and gain control device for each antenna element and a single combiner and Doppler filter for all of the beams. But such systems are not presently available.

Accordingly, a need exists for improved methods and systems for receiving multiple beams with a phased array antenna system. A further need exists for methods and systems for upgrading existing single-beam phased array antenna systems to receive multiple beams. In particular, a need exists for phased array antenna systems that can receive multiple beams without relying on multiple phase and gain control devices for each antenna element, and without dedicating separate beam formers for each beam.

SUMMARY OF THE INVENTION

The present invention meet the needs described above in a phased array antenna system that uses an intelligent beam former to drives the antenna array to receive multiple beams using a single programmable phase and gain control device for each antenna element and a single combiner and beam former for all of the beams. The intelligent beam former encodes each beam, combines the encoded beams into a combined signal, and then separates the multiple beams from the combined signal. For example, the beams may be code division multiplexed using orthogonal codes, and the beams may be decoded to separate the beams using an orthogonal code filter, such as a conventional CDMA filter. Alternatively, the beams may be frequency coded and decoded to separate the beams with a frequency filter. In a particular frequency coding example, the beams may be frequency coded by repeatedly incrementing phase shifts applied to identify beam components, and the beams may be decoded to separate the beams using a conventional Doppler filter.

Advantageously, the present invention may be used to create a multi-beam phased array antenna system using a single programmable phase and gain control device for each antenna element, a single beam forming combiner for the array, and a single beam decoder or filter for the array. That is, the invention allows a beam encoder implemented through software running on a beam forming computer, and a cooperating beam decoder, such as a conventional CDMA or Doppler filter, to effectively replace the multiplicity of antenna hardware found in conventional multi-beam phased array antenna systems. In addition, a conventional single-beam phased array antenna system may already include at least one programmable phase and gain control device for each antenna element, at least one beam forming combiner, at least one beam forming computer, and at least one Doppler filter. For this reason, the present invention may be used to upgrade many conventional single-beam phased array antenna systems to multi-beam systems without the need for extensive additional hardware.

Further, appropriate beam coding sequences for a known CDMA or Doppler filter can be determined in advance and stored in a look-up table. This allows the multi-beam controller to operate at high data rates with low computational overhead. The beam forming computer may also change the beam pattern on demand to implement target tracking and other design objectives. The beam forming computer may also change the code sets on demand, or switch between coding methodologies on demand to avoid interference on certain channels or achieve other objectives. Since the present invention implements all of these capabilities through software applied to standard antenna hardware, a very wide range of phased array antenna systems can be manufactured or upgraded to include these capabilities without substantially increasing the cost, complexity, size, or weight of the system.

Generally described, the methodology of the invention may be implemented on a beam forming computer, which may be local or remote, or it may be expressed in computer-executable instructions stored on a computer storage medium. The beam forming computer implements a method for operating a phased array antenna system to receive propagating energy at multiple antenna elements, and to form the received energy into multiple beams. In particular, the beam forming computer encodes the received beams and combines the encoded beams into a combined signal. This allows a cooperating filter to decode the combined signal to separate the beams. Typically, the system also includes a device that displays and records a representation of each beam separately.

In addition, a beam selector may obtain antenna parameters defining locations for the antenna elements and beam specifications defining pointing directions for a desired set of multiple beams. The beam selector then uses the antenna parameters and beam specifications to define control signals for forming the received energy into the desired set of beams. The beam forming computer then embeds coding parameters into the control signals, and applies the encoded control signals to phase and gain control devices associated with each antenna element. This methodology may be repeated for different desired beam sets, which allows the system to change beams on demand to track a detected target, to monitor a space while avoiding a known signal, or to achieve other objectives.

Further, a code selector may obtain coding parameters for different desired coding strategies, such as different frequency code sets and different orthogonal code sets. The beam forming computer embeds these coding parameters into the control signals, and applies the encoded control signals to phase and gain control devices associated with each antenna element. This methodology may be repeated for different desired coding parameter sets, which allows the system to change coding strategies on demand to avoid channels with interference or to achieve other objectives. In addition, the code selector, the beam selector, and the beam forming computer may be implemented on separate computing devices, or they may be implemented on a single computing machine.

The control signal for each antenna element may be applied to a single phase and gain control device dedicated to the corresponding antenna element. In this case, the control signal for each antenna element includes the vector sum of beam components corresponding to each beam. Alternatively, each antenna element may include a plurality of phase and gain control devices with one phase and gain control device dedicated to each beam. In this case, the control signal for each antenna element is applied to the plurality of phase and gain control devices associated with the corresponding antenna element, with each phase and gain control device receiving the control signal component for a corresponding beam. In either case, the encoded beams are combined in a beam forming combiner, and the multiple beams are separated from the combined signal using a filter that is designed to detect the coding parameters embedded into the control signals by the beam forming computer.

More specifically, the beam forming computer typically forms the received energy into multiple beams by defining a control signal for each antenna element, in which each control signal includes a beam component corresponding to each beam. The beam forming computer then encodes the beams by embedding a coding parameter into each beam component identifying the corresponding beam. Using the same coding parameter for a corresponding beam at each antenna element allows the beam decoder to identify the beam components by detecting the coding parameters as they are reflected in the combined signal, and to extract and combine the components having similar coding parameters to assemble the various beams.

On the encoding side, the beam forming computer preferably computes an in-phase component for the control signal for each antenna element as a sum of in-phase beam components for the corresponding antenna elements. That is, the control signal for each antenna element typically includes one in-phase component for each beam. Similarly, the beam forming computer also preferably computes a quadrature component for the control signal for each antenna element as a sum of quadrature beam components for the corresponding antenna elements. Again, the control signal for each antenna element typically includes one quadrature component for each beam. The beam forming computer then computes a total gain and a total phase shift for each antenna element from the corresponding in-phase and quadrature components. For example, the total gain and total phase for a particular antenna element is typically computed as the vector sum of the beam component vectors for that antenna element, in which a coding parameter has been embedded into the in-phase and quadrature beam components for each antenna element.

A beam decoder later detects these coding parameters to identify the beam components, which are assembled into the separate beams for further processing, display, or recording. For example, using the same coding parameter for a corresponding beam in the control signal for each antenna element allows the filter to assemble the beams directly by detecting the coding parameters and combining the components having similar parameters into corresponding beams. Further, using channel indicatory as the coding parameters allows the decoder to directly assign the assembled beams to corresponding channels. Although this type of direct beam component identification and channel assignment scheme is computationally efficient and straightforward to implement, other more complicated indirect beam component identification and channel assignment schemes may be employed.

For example, the coding parameters used to encode a particular beam need not be identical for each antenna element so long as there is some appropriate correlation system for identifying which components go with which beam on the decoding side. In particular, using the same beam parameter to identify the components for a particular beam at each antenna element is a straightforward way to accomplish this result, which obviates the need for a correlation step on the decoder end. Nevertheless, other decoding schemes, such as those using a correlation table, correlation formula or other appropriate mechanism may be used to associate detected components into the desired beams. Further, the decoder may be synchronized with the precise coding parameters that are embedded into the control signals, or there may be a correlation step used to associate the detected coding parameters with those used by the decoder to assemble the beams and assign the beams to channels. In addition, the coding parameters may themselves indicate channels for further processing, displaying or recording the beams, or there may be an intermediate step to assign the assembled beams to channels.

Further, many other coding, decoding, channel assignment, and correlation schemes will become apparent using the basic beam encoding approach of the present invention. But in every such system, the decoder directly or indirectly detects the coding parameters, which the encoder embedded into control signals to permit beam component identification, and uses the detected coding parameters directly or indirectly to identify which components form which beams. Once this has been accomplished, many different schemes may be employed to assemble the beams and assigned the assembled beams to channels for further processing, display, or recording.

In one embodiment, the beams are encoded with frequency codes and decoded with a conventional Doppler filter, which serves as the beam decoder. That is, the beams are encoded by embedding frequency shifting parameters into the in-phase and quadrature beam components, and the beams are later decoded with the Doppler frequency filter and assembled in the manner described above. In another embodiment, the beams are encoded with orthogonal codes and decoded with a conventional CDMA filter, which serves as the beam decoder. Again, the beams are encoded by embedding orthogonal codes into the in-phase and quadrature beam components, and the beams are later decoded with the CDMA orthogonal code filter and assembled in the manner described above.

The invention may be used to implement a multi-beam phased array antenna system that includes a plurality of antenna elements, one or more phase and gain control devices for each antenna element, and a typically a single beam forming combiner creating a combined signal from the signals received from the antenna elements. As described above, a beam forming computer is configured to generate control signals to drive the phase and gain control devices to create multiple beams, in which each beam is identified by a coding parameter embedded into the control signals. In addition, a filter is configured to receive the combined signal, detect the coding parameters, and separate the beams using the coding parameters.

The antenna system may also include a beam selector configured to identify desired beam sets. In this case, the beam forming computer is configured to generate control signal to drive the phase and gain control devices to create multiple beams for each desired beam set defined by the beam selector. Further, the antenna system may include a code selector configured to identify desired coding parameter sets. In this case, the beam forming computer is configured to generate control signals to drive the phase and gain control devices to create multiple beams for each desired coding parameter set defined by the code selector. As noted above, the coding parameter sets may include orthogonal code and frequency code sets.

In view of the foregoing, it will be appreciated that the present invention avoids the drawbacks of prior methods for creating multi-beam phased array antenna systems. The specific techniques and structures for creating multiple-beams with minimal antenna hardware, and thereby accomplishing the advantages described above, will become apparent from the following detailed description of the embodiments and the appended drawings and claims.

BRIEF DESCRIPTION OF THE DRAWINGS

FIG. 7 illustrates the mathematical expression of antenna parameter, beams, and signals received at various antenna elements.

FIG. 8 illustrates antenna beam parameter computed from antenna element positions and desired beam pointing directions.

FIG. 9 illustrates the mathematical derivation of antenna beam parameter computed from antenna element positions and desired beam pointing directions.

FIG. 15 illustrates the mathematical expression of control signals used to drive the antenna system of FIG. 14.

FIG. 19 is a table illustrating a look-up method for storing control signal parameters for operating a multi-beam phased array antenna system to detect and separate multiple beams using frequency channels.

FIG. 20 illustrates the mathematical expression of control signals for initializing a multi-beam phased array antenna system to detect and separate multiple beams using frequency channels.

FIG. 21 illustrates the mathematical expression of control signals for operating a multi-beam phased array antenna system to detect and separate multiple beams using frequency channels during a first time interval.

FIG. 22 illustrates the mathematical expression of control signals for operating a multi-beam phased array antenna system to detect and separate multiple beams using frequency channels during a second interval.

FIG. 23 illustrates the mathematical expression of control signals for operating a multi-beam phased array antenna system to detect and separate multiple beams using frequency channels during a third time interval.

FIG. 24 illustrates the mathematical expression of control signals for operating a multi-beam phased array antenna system to detect and separate multiple beams using frequency channels during an arbitrary time interval.

FIG. 25 illustrates a look-up table for storing phase shift parameters for operating a multi-beam phased array antenna system to detect and separate multiple beams using frequency channels.

FIG. 26 illustrates a set of phase shift parameters for operating a multi-beam phased array antenna system to detect and separate multiple beams using frequency channels.

DETAILED DESCRIPTION OF THE EMBODIMENTS

Figure 1:
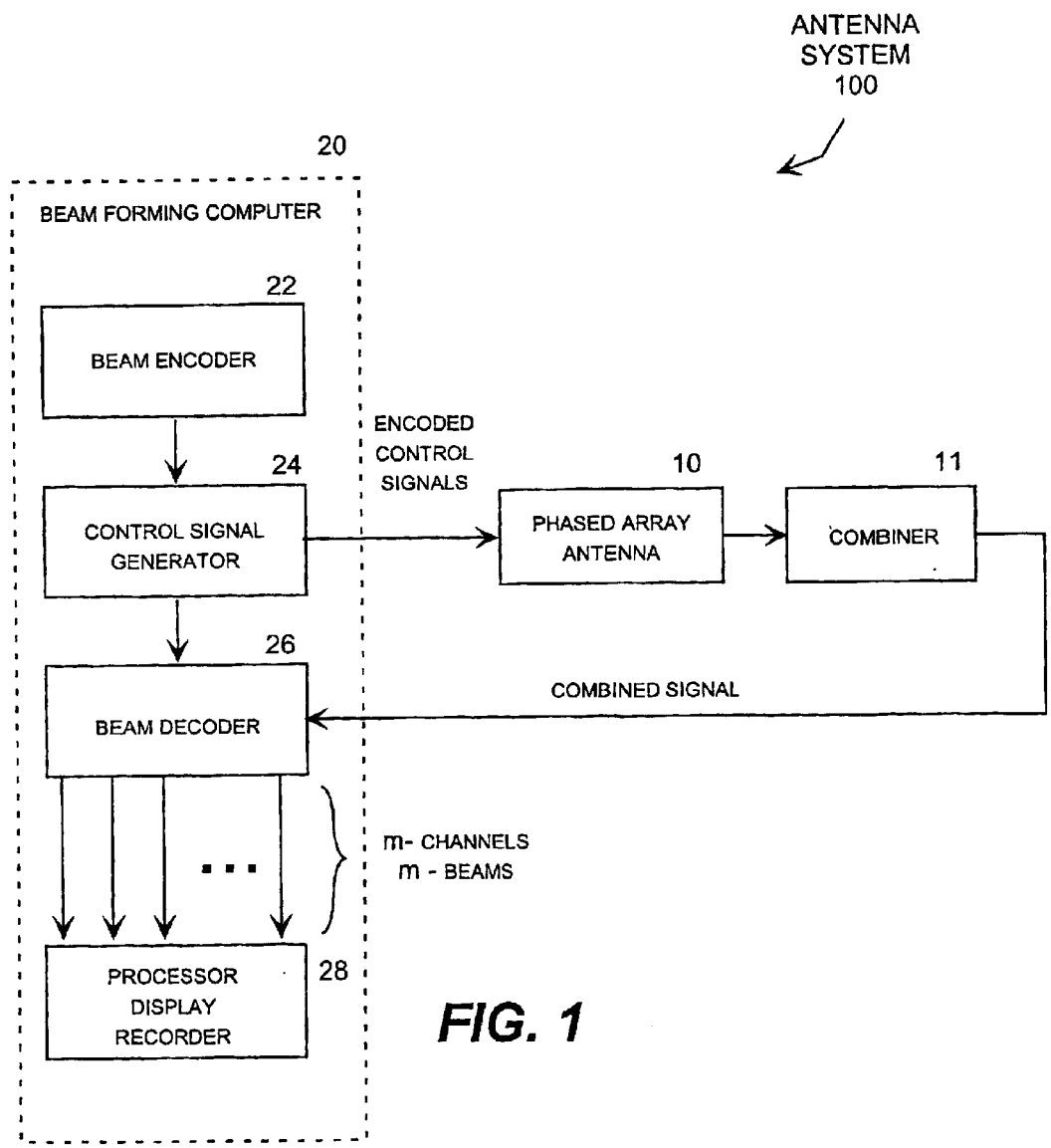
FIG. 1 is a block diagram of a multi-beam phased array antenna system.

Briefly described, the invention may be embodied in a phased array antenna system that is operative to simultaneously form multiple beams without requiring an undue amount of hardware. The phased array antenna system collects propagating energy in a number of antenna elements to form multiple beams, encodes the beams as the energy is collected, combines the encoded beams, and then decodes the combined signal to separate the beams. In this way, the beams can be formed with a single set of antenna hardware instead of requiring a multiplicity of antenna hardware, one for each beam, as is needed in prior art multi-beam antenna systems. This greatly reduces the cost, complexity, size and weight of the antenna system.

Preferably, the beams are encoded on separate orthogonal code channels corresponding to conventional CDMA filter channels or frequency code channels corresponding to conventional Doppler filter channels, although other coding techniques can be employed. In the instance of coding by frequencies, the beams are assigned to separate frequencies, for example by repeatedly applying phase shifts to create the coding frequencies. The encoded antenna signals encoded in this manner are combined into a combined signal, and then separated into the individual beams using a frequency filter. For example, the frequency coding may be implemented by repeatedly applying a phase shift to each beam component at each antenna element, in which the same phase shift is applied to the components for the same beam at each antenna element. The beams are then separated from the combined signal received from all of the antenna element using a standard Doppler filter, which separates the beams based on the frequency shifts created by the coding parameters. Alternatively, a code division multiplexing technique may be implemented by using an orthogonal code generator to apply an orthogonal code to each beam, and then using a standard CDMA filter to separate the beams. Other coding systems can be employed using this same basic beam encoding approach.

Although the embodiments of the invention described below are tailored for a radar system, it should be understood that the same techniques may be applied to any other system for receiving propagating energy, such as sonar systems, optic systems, and systems operating at any other range in the frequency spectrum, by adjusting the hardware physical design parameters to be appropriate for the selected frequency range and propagation medium. Further, the invention may be embodied equally effectively in phased array antennas having different antenna configurations and communication objectives. For example, the invention is equally applicable to target recognition, target tracking, satellite communication systems, missile systems, missile defense systems, and so forth. Similarly, the invention is equally applicable to phased array antenna systems with planar arrays, curved arrays, cylindrical arrays, hemispherical arrays, spherical arrays, conical arrays, and so forth.

Due to the ability of the invention to generate multiple beams with a single antenna control device for each antenna element, the invention is well suited to phased array systems with large numbers of antenna elements and beams. However, the invention is equally applicable to antenna systems with any number of elements or beams. In addition, the invention may be embodied in a new antenna system or as an upgrade to an existing antenna system. In particular, a typical single-beam active phased array antenna system already includes at least one programmable phase and gain control device for each antenna element, at least one beam forming combiner, and at least one beam forming computer. In addition, systems operated for Doppler pulse radar application already include at least one Doppler filter. Therefore, the present invention may be used to upgrade many of these conventional single-beam phased array antenna systems to multi-beam systems without the need for extensive additional hardware. It should be understood that the terms "phase and gain control device" and "gain and phase control device" are used synonymously, and that the "phase" and "gain" control portions may be physically embodied in a single device or in different devices. The phase and gain control devices may be embodied in conventional attenuators and phase shifters, although any suitable device, whether known today or invented in the future, for performing these functions may be employed.

Turning now to the figures, in which similar reference numerals indicate similar elements in the several figures, FIG. 1 is a functional block diagram illustrating the components of a multi-beam antenna system 100 utilizing the beam encoding technology of the present invention. Generally, the antenna system 100 includes a phased array antenna 10 with an arbitrary number "n" antenna elements. The antenna system 100 also includes a combiner 11 that combines the signals from these "n" antenna elements into a combined signal, which is the vector sum or superposition of the signals produced by the "n" antenna elements. To control the antenna elements, the antenna system 100 includes a beam forming computer 20, which typically includes a beam encoder 22, a control signal generator 24, a beam decoder 26, and a downstream processor 28. The beam decoder 26 produces signals for "m" beams on "m" separate channels, which are typically supplied to the downstream processor 28, which may include additional processors, a display, a recorder, and other elements. It should be understood that other elements may be deployed as part of the beam forming computer 20, and that any of the components shown as part of the beam forming computer may be deployed as separate components in separate enclosures. For example, the beam encoder 22, the control signal generator 24, the beam decoder 26, and the downstream processor 28 may be deployed in a combined enclosure, as suggested by FIG. 1, or they may be deployed in separate enclosures, or they may be combined in any manner suitable to a particular application. In addition, each element may be located in a single physical location, or it may be distributed in a network environment. Therefore, the grouping of elements shown in FIG. 1 is a matter of descriptive convenience, and need not be reflected in any particular embodiment of the invention.

Generally stated, the control signal generator 24 drives the phased array antenna 10, which includes multiple antenna elements that each have one or more gain and phase control devices that are individually controlled by the control signal generator 24 to receive an arbitrary number of "m" breams. The signals received from the "n" controlled antenna element are then combined in beam forming combiner 11, which produces a combined signal that is supplied to the beam decoder 26. The beam decoder, in turn, decodes the combined signal to separate the "m" beams from the combined signal. The beam decoder 26 then supplies "m" separate beams signals to the downstream processor 28, which may perform a number of functions, such as further processing the beams, displaying the beams, and recording the beams. To make this beam separation possible at the beam decoder 26, the beam encoder 22 generates coding parameters, which the control signal generator 24 embeds into the control signals. Applying these encoded control signals to the phase and gain control devices of the antenna 10 causes the "n" antenna elements to receive "m" directional beams, which are encoded with specific coding parameters that the beam decoder 26 is configured to detect. This allows the beam decoder 26 to identify the coding parameters and use this information to assemble the "m" beams from the combined signal received from the combiner 11 The beam encoder 22 generates the coding parameters for each desired encoding scheme and supplies the coding parameters to the control signal generator 24. For example, the beam encoder 22 may generate orthogonal codes for use in an orthogonal coding scheme, or it may generate phase shift parameters for use in a frequency coding scheme. In each instance, the beam encoder 22 is provided with the operational specifications for the beam decoder 26 and the control signal generator 24, and generates coding parameters that the beam decoder 26 is configured to detect when they are properly reflected in the control signals created by the control signal generator 24 and applied to the phase and gain control devices of the antenna array 10. Stated somewhat differently, the beam encoder 22 ensures that the coding parameters are selected to properly synchronize the operation of the beam decoder 26 with the control signal generator 24, and that the control signals and beams will be within the operational ranges of the associated devices.

The control signal generator 24 receives the coding parameters from the beam encoder 22 and a clock signal, and embeds the coding parameters into the control signals in accordance with the clock signal to produce control signal time functions. These control signals are applied to the to the phase and gain control devices of the antenna array 10 to cause the array to receive "m" encoded beams simultaneously. In particular, the control signal for each antenna element includes a component for each desired beam. If the antenna element includes a separate programmable phase and gain control device for each beam, then each beam component is applied to a corresponding phase and gain control device at each antenna element. If, on the other hand, each antenna element includes only a single programmable phase and gain control device (this is used for this implementation), then the vector sum of the beam components for a particular antenna element is applied to the phase and gain control device for that antenna element. This vector resultant control signal is referred to as the "total gain" and "total phase shift," which the control signal generator 24 controls over time for each antenna element in the array 10.

As noted above, the signals produced by the "n" antenna elements are combined into a combined signal, which is also referred to as vector sum or superposition of the individual element signals. This combined signal is then provided to the beam decoder 26, which his configured to detect the coding parameters and use this information to extract the beam components from the various antenna element signals and combine them into the desired beams. It should be understood that the coding parameters used to encode a particular beam need not be identical for each antenna element so long as there is some appropriate correlation system for identifying which components go with which beam on the decoding side.

In particular, using the same beam parameter to identify the components for a particular beam at each antenna element is a straightforward way to accomplish this result, which obviates the need for a correlation step on the decoder end. Nevertheless, other decoding schemes, such as those using a correlation table, correlation formula or other appropriate mechanism may be used to associate detected components into the desired beams. Further, the decoder 26 may be synchronized with the precise coding parameters that are embedded into the control signals, or there may be a correlation step used to associate the detected coding parameters with those used by the decoder to assemble the beams and assign the beams to channels. In addition, the coding parameters may themselves indicate channels for further processing, displaying or recording the beams, or there may be an intermediate step to assign the assembled beams to channels.

Furthermore, many other coding, decoding, channel assignment, and correlation schemes may become apparent to those skilled in the art once the basic beam encoding approach of the present invention is understood. But typically, the decoder 26 directly or indirectly detects the coding parameters, which the encoder 22 embedded into control signals to permit beam component identification. The decoder 26 uses the detected coding parameters directly or indirectly to identify which components form which beams. Once this has been accomplished, many different schemes may be employed to assemble the beams and assign the assembled beams to channels, whether those channels are assigned to single beams or combinations of beams, for further processing, display, or recording.

Figure 2:
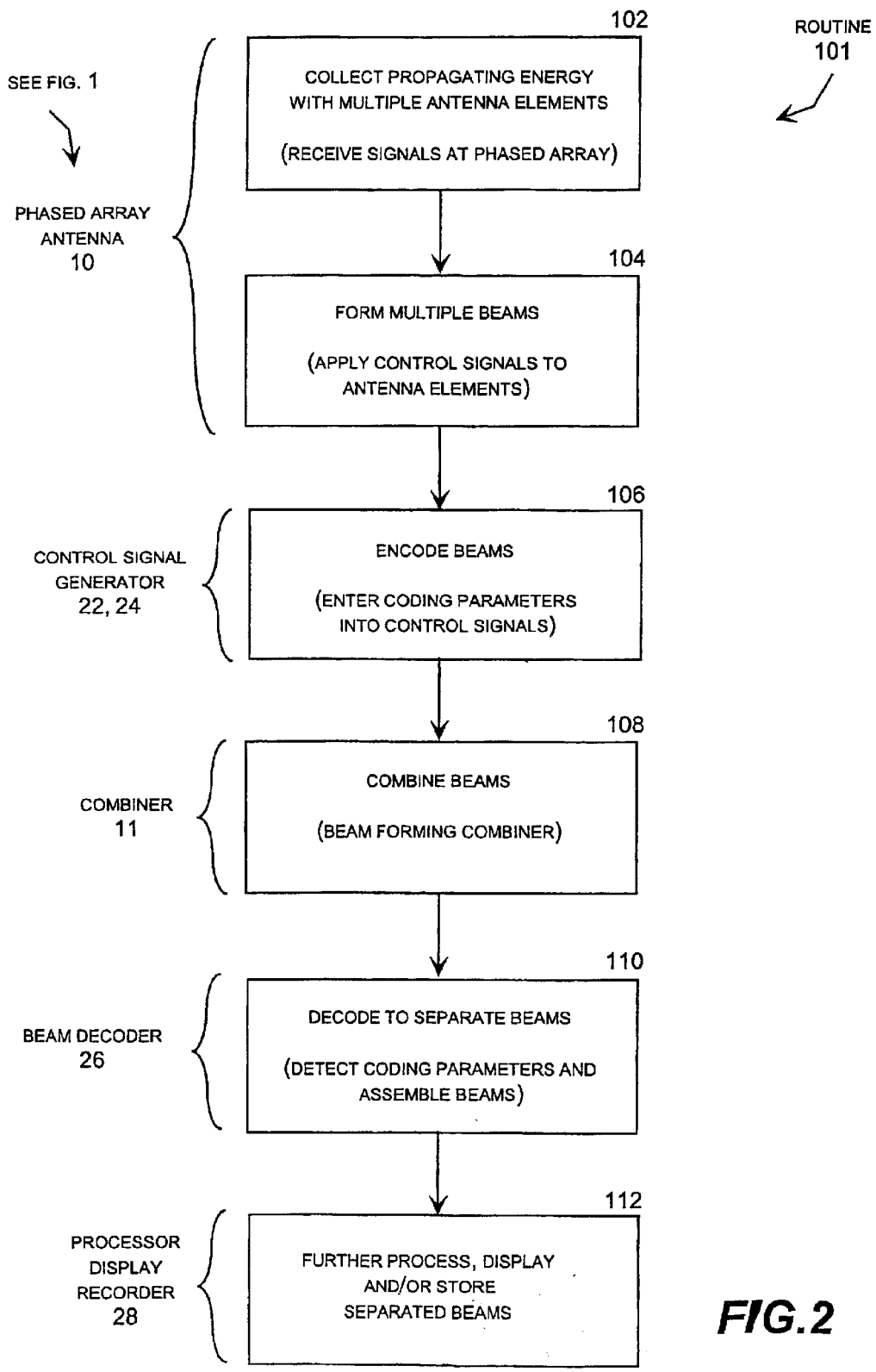
FIG. 2 is a logic flow diagram illustrating a routine for receiving multiple beams with a phased array antenna system.

FIG. 2 is a logic flow diagram illustrating a routine 101 for receiving multiple beams with a phased array antenna system. In step 102, the antenna system receives propagating energy with multiple antenna elements, for example in an appropriately configured phased array. In addition, the signals are usually amplified by a low-noise amplifier to establish the noise figure. Step 102 is followed by step 104, in which the antenna system forms the received energy into multiple beams, for example by channeling the energy through appropriate antenna hardware or by applying appropriate control signals to the antenna hardware. Step 104 is followed by step 106, in which the antenna system encodes the beams with coding parameters, for example by embedding the coding parameters into the control signals applied to the antenna hardware. Step 106 is followed by step 108, in which the antenna system combines the encoded beams, for example with a beam forming combiner. Step 108 is followed by step 110, in which the antenna system separates the combined signal to recover the separate beams, for example by detecting the coding parameters and assembling the components with similar coding parameters together to form beams. Step 110 is followed by step 112, in which the antenna system displays and/or records the beams separately. For example, a representation of the individual beams may be displayed on computer screens and supplied to a computer tracking or target recognition system for further analysis.

Figure 3:
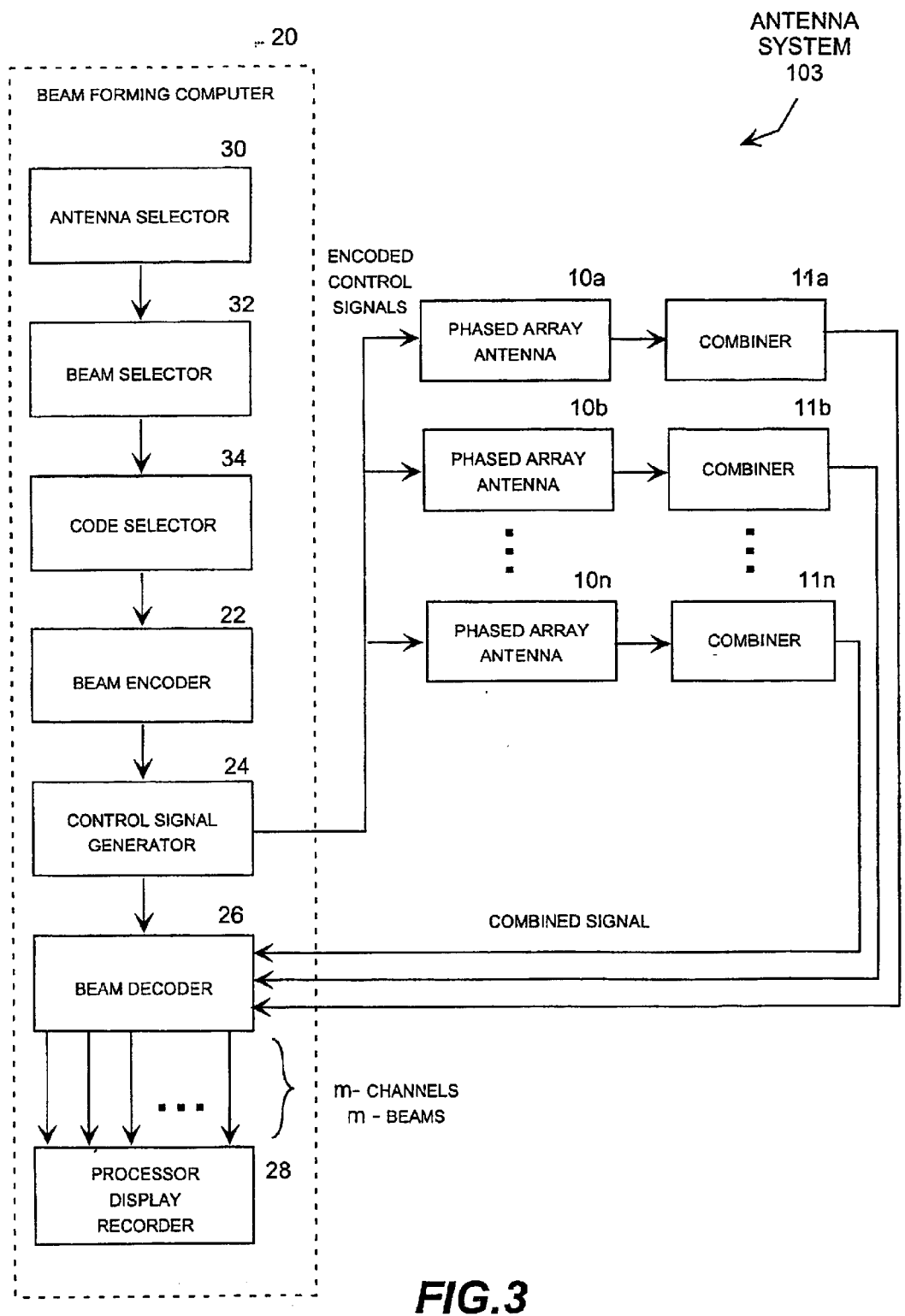
FIG. 3 is a block diagram of a multi-beam phased array antenna system with multiple antennas, and antenna selector, a beam selector and a code selector.

FIG. 3 is a block diagram of an expanded multi-beam phased array antenna system 103, which includes the components of the antenna system 100 shown in FIG. 1 along with additional components, including multiple antennas 10*a–n*, multiple combiners 11*a–n*, an antenna selector 30, a beam selector 32, and a code selector 34. FIG. 3 illustrates additional functions and components that may be incorporated into an antenna system to build upon the basic beam encoding and decoding technology shown in FIG. 1. For example, the antenna system 103 may include any number of phased array antennas 10*a–10n*. That is, the beam encoding technology of the present invention may be used to drive a single phased array antenna to receive multiple beams, or it may be used to drive any number of phased array antennas to receive multiple beams. For example, the antenna system 103 may simultaneously operate more than one antenna, or it may switch among antennas on demand. Further, the antenna system 103 may select desired beam sets for one or more of the antennas, and may select desired code sets for encoding the beams one or more of the antennas, on demand. These functions are implemented by a beam forming computer 20, which generates control signals to operate phase and gain control elements for the antenna elements within the phased array antennas 10*a–10n*.

More specifically, the beam forming computer 20 includes the beam encoder 22, the control signal generator 24, and the beam decoder 26 described above with reference to FIG. 1, along with one or more additional components including an antenna selector 30, a beam selector 32, a code selector 34. Again, it should be understood that all of these elements may be deployed in a combined enclosure as part of the beam forming computer 20, as suggested by FIG. 1, or each element may be deployed in a separate enclosure, or they may be combined in any manner suitable to a particular application. In addition, each element may be located in a single physical location, or it may be distributed in a network environment.

In general, the antenna selector 30 allows the beam forming computer 20 to adapt to antenna arrays with different physical configurations, such as those configured for different monitored volumes and different carrier wavelengths. For example, the antenna selector 30 allows the beam forming computer 20 to select among multiple antennas 10*a–10n* with different physical configurations, which can each be controlled to receive multiple encoded beams. As a result, the beam forming computer 20 can control each of the antennas 10*a–10n* simultaneously or separately in time, as desired. The antenna selector 30 also allows the beam forming computer to control an antenna with a changing or selectable physical configuration. For example, a particular antenna may include multiple array faces, movable panels, or a pliable array that may be physically altered on demand or in response to external conditions. This operational flexibility brings a wide range of antenna deployment and control schemes under the control of the beam forming computer 20. In particular, multiple arrays may be simultaneously and/or serially controlled by the beam forming computer 20, and the received beams may be analyzed individually or in combination, as desired for a particular application. For example, different antenna arrays with different carrier wavelengths designed for different functions may be controlled in a coordinated manner, such as antennas designed for search operate in the S-band and target discrimination operate in the X-band. Similarly, other antenna arrays designed for other applications may controlled in a coordinated manner using the same beam forming computer 20, such as antennas designed for surveillance, signal intelligence (SIGINT), electronic warfare (EW), electronic counter measures (ECCM), and so forth.

The beam selector 32 allows the beam forming computer 20 to define a desired set of "m" beams for each antenna array under its control. That is, the desired beam pattern may be changed on demand to accommodate a wide range of monitoring objectives, such as target tracking, avoiding known incoming signals such as ground clutter, and so forth. For example, the beam selector 32 allows configurable beam patterns to be defined for multiple antennas under the control of the beam forming computer 20 to implement coordinated multi-antenna, multi-beam monitoring tasks that may be particularly useful for missile defense, air traffic control and other applications with multiple monitoring objectives. In a missile defense system, for example, one antenna system may track targets while another distinguishes between decoys and real targets. As another example, in an air traffic control application, one antenna system may track an aircraft while another monitors wind conditions and air turbulence in the aircraft's path. Many other coordinated multi-antenna, multi-beam monitoring applications and objectives may become apparent using the basic beam encoding approach of the present invention.

The code selector 34 allows the beam forming computer 20 to select among code sets and coding methodologies for encoding the beams for each multi-beam antenna system under its control. For example, the beam forming computer 20 may switch between frequency coding and orthogonal coding on demand. Within the frequency coding category of beam encoding techniques, the beam forming computer 20 may switch among frequency code sets on demand. Similarly, within the orthogonal coding category of beam encoding techniques, the beam forming computer 20 may switch among orthogonal code sets on demand. This allows the beam forming computer 20 to reuse frequency and code sets as desired, for example to avoid interference, to use different coding techniques for different antennas under its control, to take advantage of preexisting equipment available at a particular location, and to achieve a wide range of other objectives. Although this specification describes a frequency coding technique using a Doppler filter as a decoder as a first illustrative embodiment, and an orthogonal coding technique using a CDMA filter as a decoder as a second illustrative embodiment, other beam encoding techniques may be used.

Figure 11:
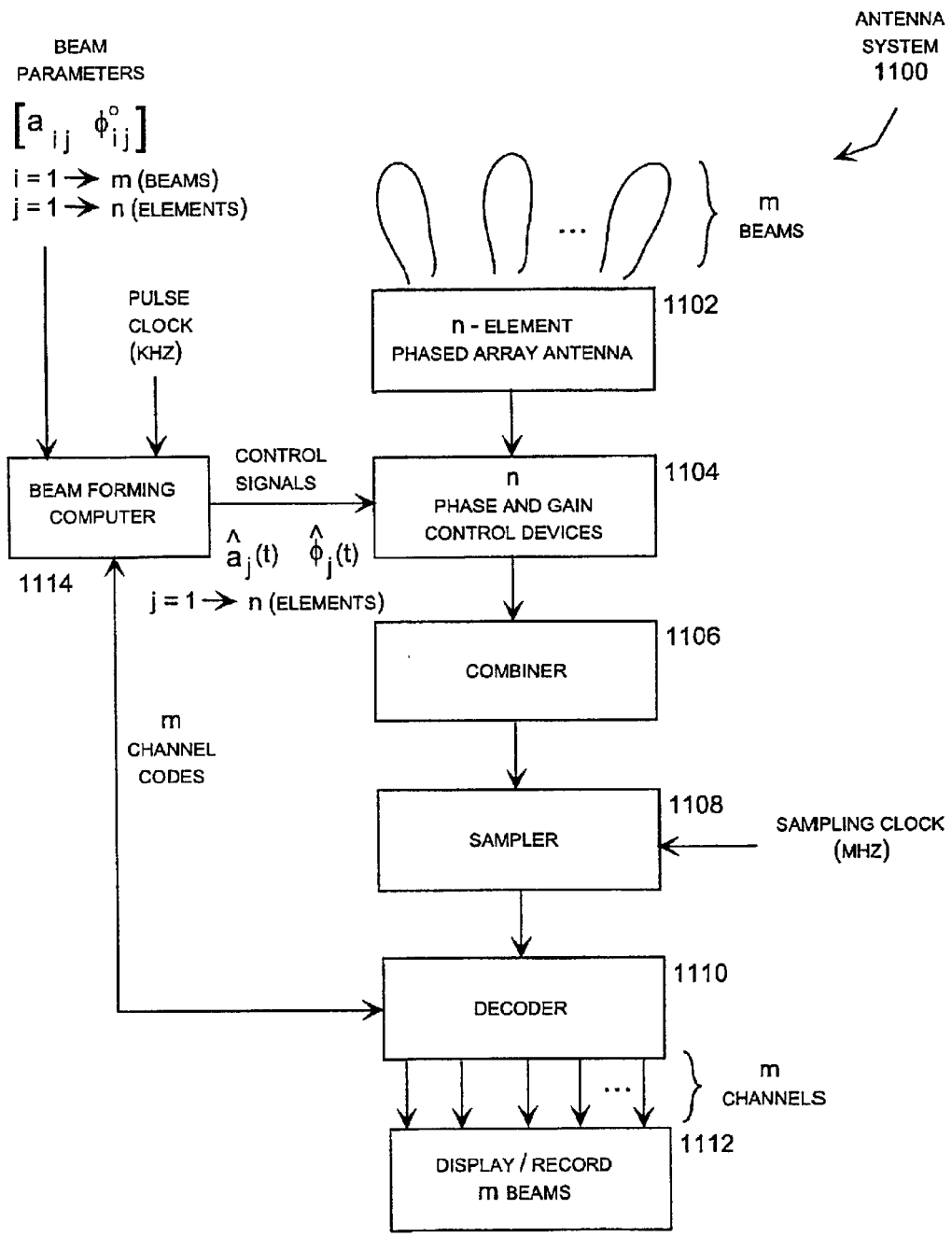
FIG. 11 is a block diagram illustrating a phased array antenna system configured to receive, encode, and decode multiple beams.
Figure 12:
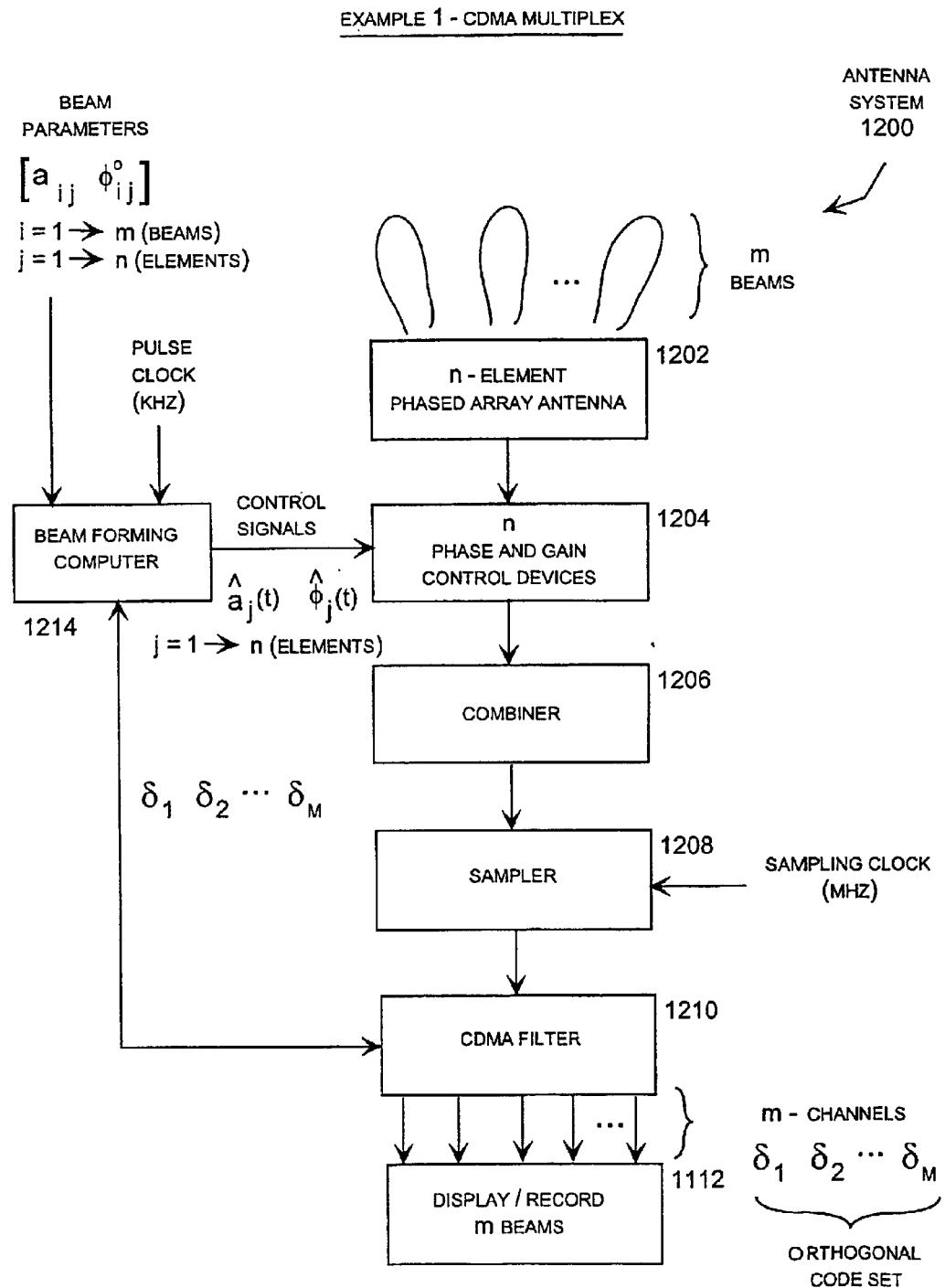
FIG. 12 is a block diagram illustrating a phased array antenna system configured to receive, encode, and decode multiple beams using orthogonal codes.
Figure 13:
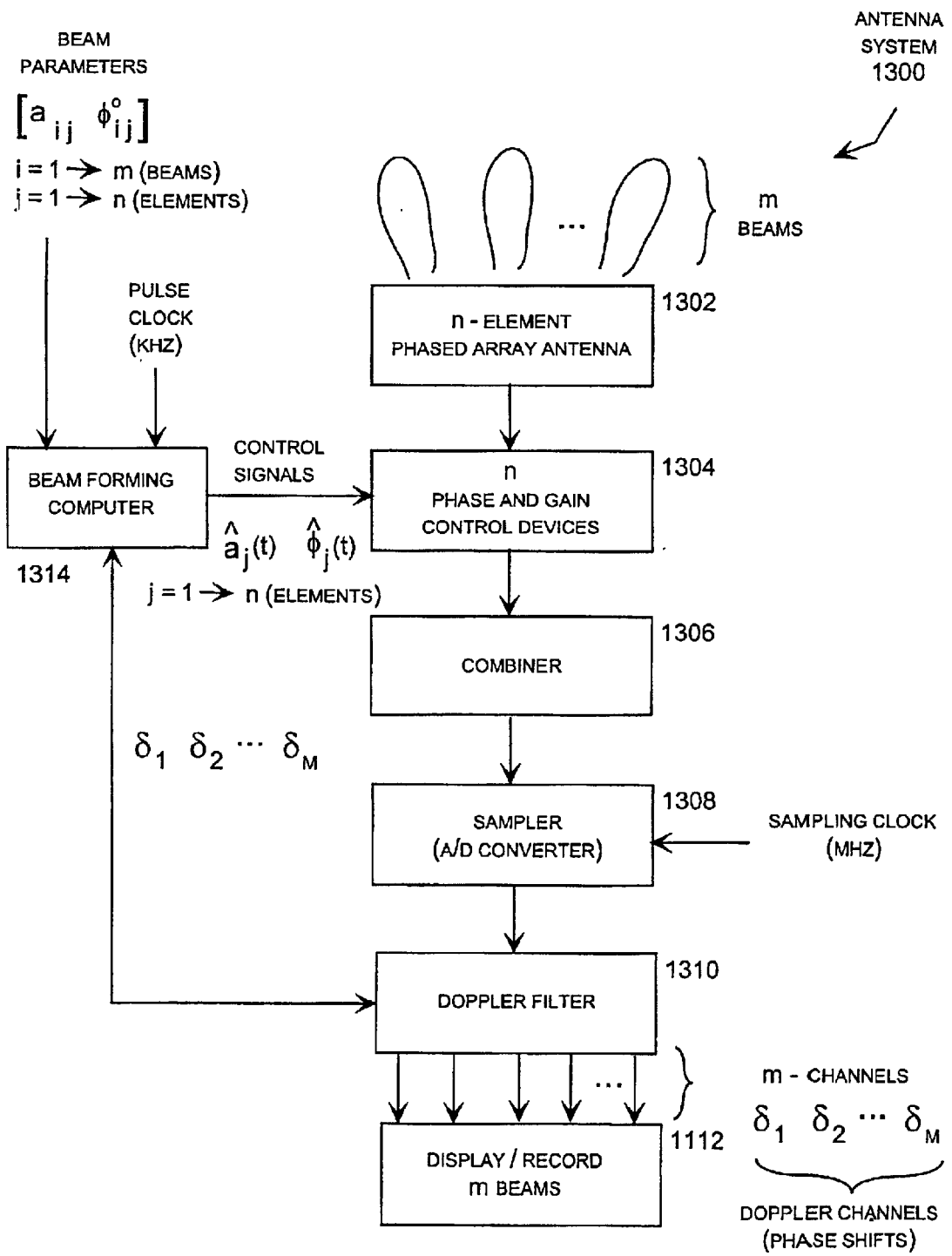
FIG. 13 is a block diagram illustrating a phased array antenna system configured to receive, encode, and decode multiple beams using frequency channels.
Figure 27:
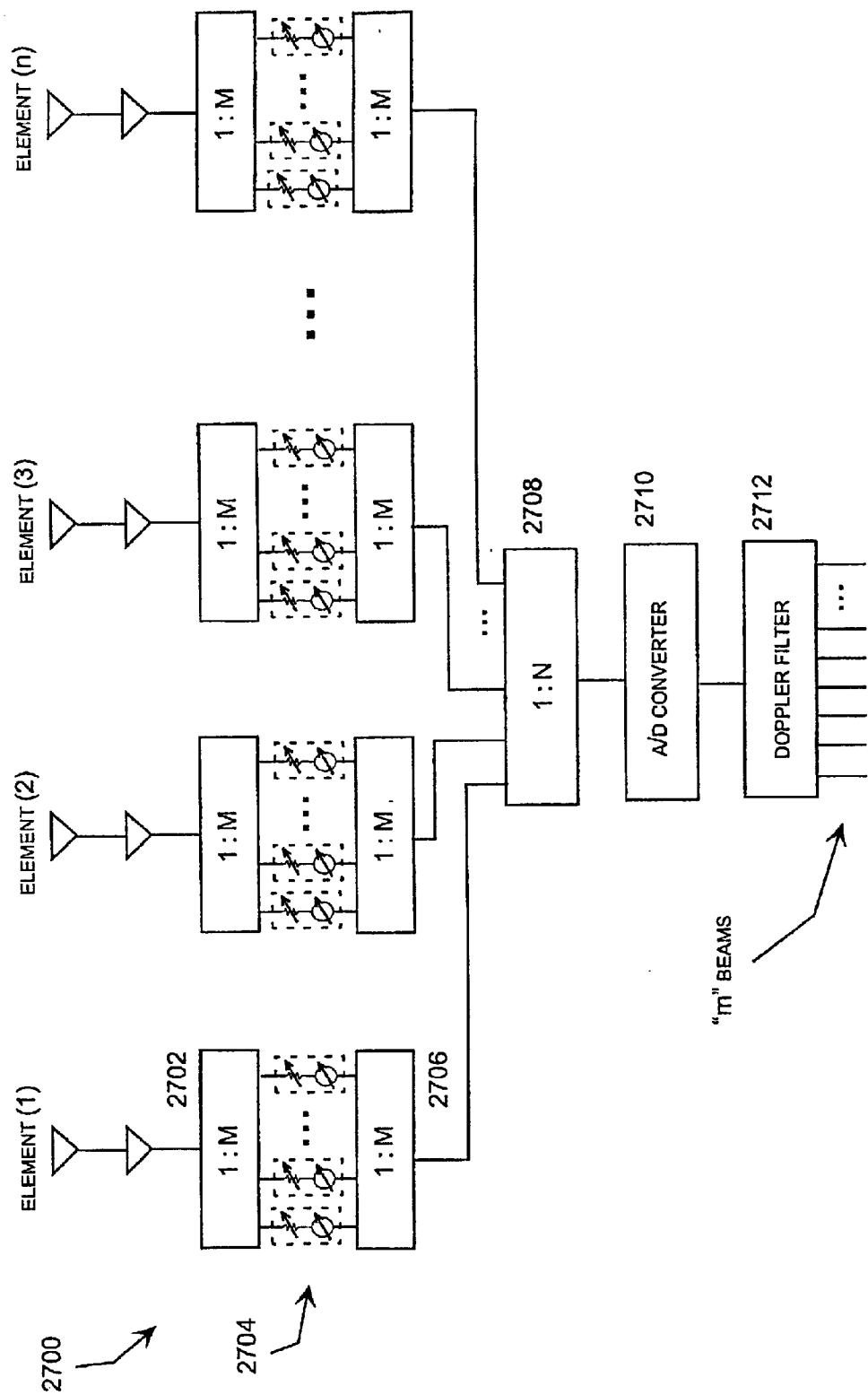
FIG. 27 is a schematic diagram of an alternative phased array antenna system configured to receive, encode, and decode multiple beams.
Figure 28:
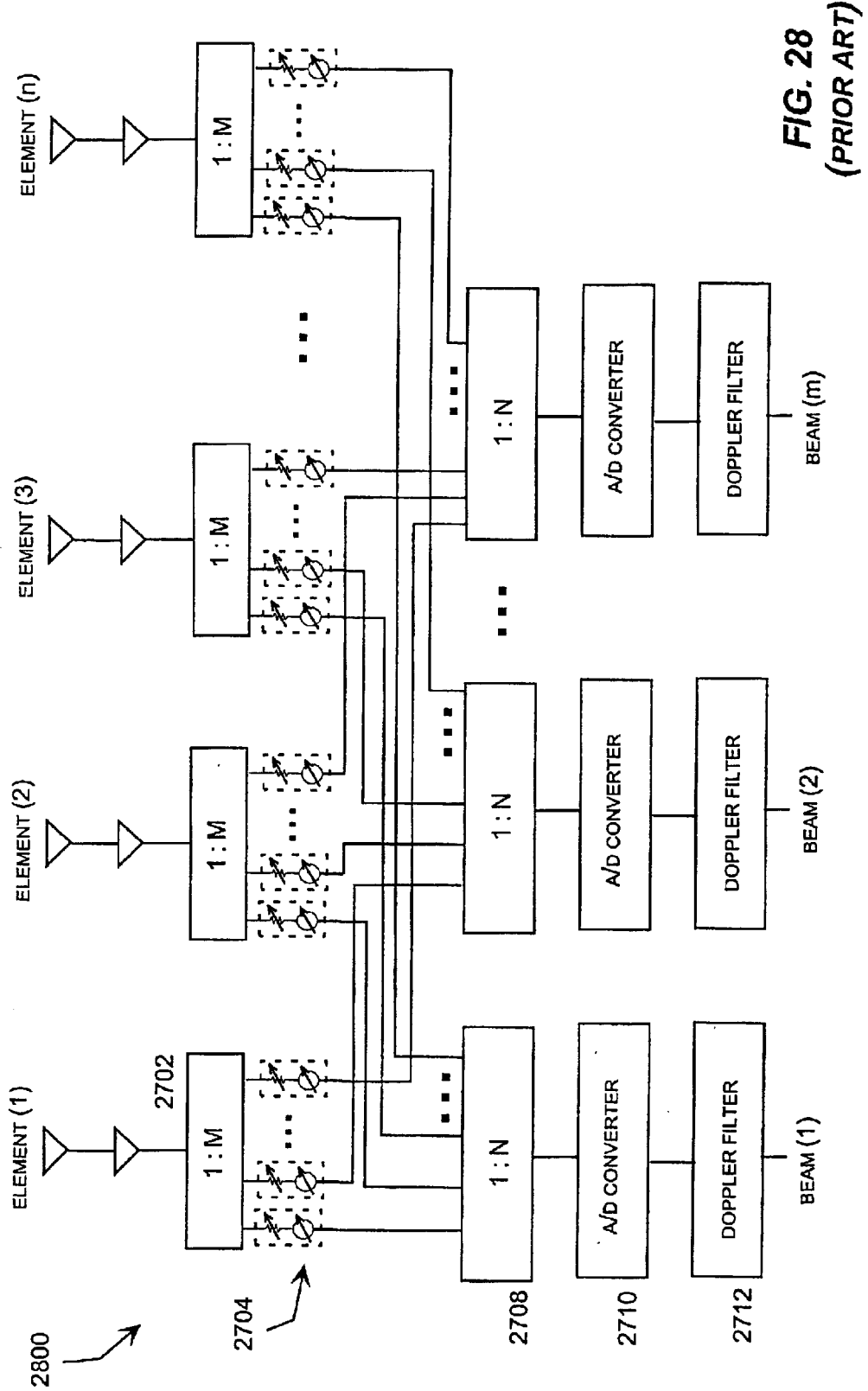
FIG. 28 is a schematic diagram of a prior art phased array antenna system configured to receive, encode, and decode multiple beams.

Still referring to FIG. 3 for the purpose of explaining the relationship among the more detailed FIGS. 4A–28 to the higher-level depiction of the antenna system 103 shown on FIG. 3, FIGS. 4A–D show some examples of the types of phased array antennas 10a–n that may be controlled by the beam forming computer 20. FIGS. 5–10 illustrate the operation of the antenna selector 30 and the beam selector 32, and further explain in detail how to derive the appropriate antenna and beam equations from the physical characteristics of a particular antenna array and a desired beam set. FIGS. 11–13 are block diagrams illustrating a generalized embodiment, an orthogonal coding embodiment, and a frequency coding embodiment of the present invention, respectively. FIGS. 14–18 expand the description of the frequency coding embodiment shown in FIG. 13 show in detail how to use a conventional Doppler filter as the beam decoder 26. FIG. 19 illustrates a generalized look-up table that may be used to store parameters for the control signal generator 24 to permit antenna control with high data rates and low computational overhead. FIGS. 20–26 provide a detailed mathematical development for the control signals for the frequency coding embodiment. FIG. 27 shows an intermediate antenna design and FIG. 28 shows a prior art "brute force" design, which may be compared to the preferred embodiment shown in FIG. 14 to illustrate the hardware savings achieved by the present invention. That is, the transition from FIGS. 28 to 27, and then from FIGS. 27 to 14, demonstrates the hardware savings achieved by embodiments of the invention versus the prior art antenna system of FIG. 28 and the intermediate antenna system of FIG. 27.

Figure 4A:
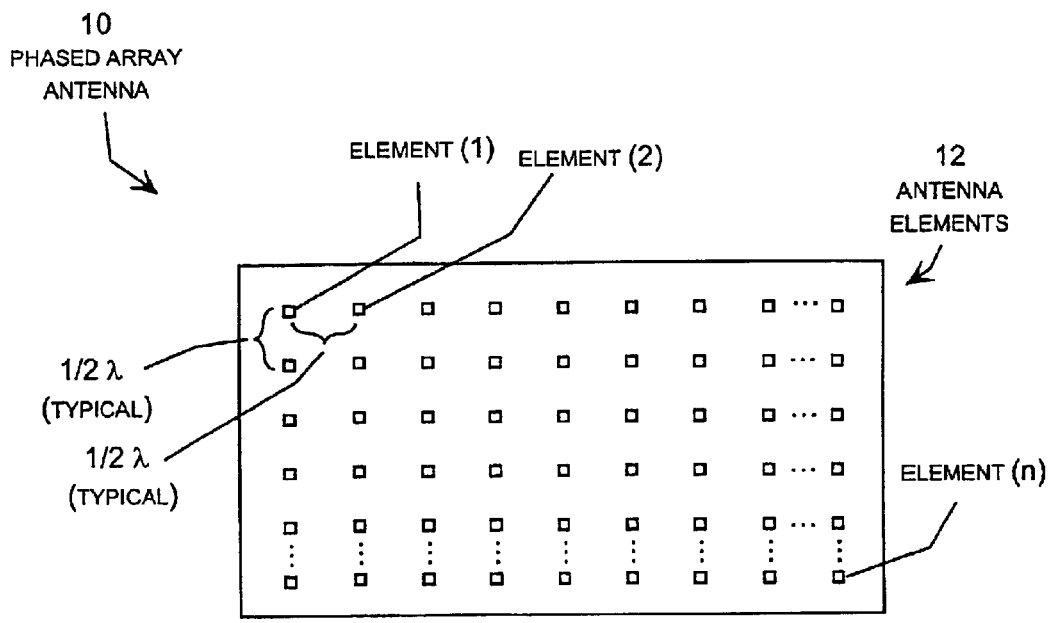
FIG. 4A is a block diagram of a planar phased array antenna configuration.

Turning now to the more detailed drawings, FIG. 4A is a block diagram illustrating a planar phased array antenna configuration 10. The array includes a number of antenna elements 12, which are identified as element (1), element (2), and so on through element (n). This configuration generally is referred to as an "n-element" array. The number of elements "n" may be large, such as 1,000 or 10,000, in which each element may be a simple low gain receiving device, such as an open wave guide. Alternatively, each antenna element may include some type of lens or collector, but this is not required for the purpose of implementing the encoded beam forming methodology of the present invention. Typically, the antenna elements are placed in the array with a spacing of one-half of the wavelength ($\lambda$) of the intended carrier frequency. Nevertheless, this design parameter may be changed without affecting the encoded beam forming methodology of the present invention.

Figure 4B:
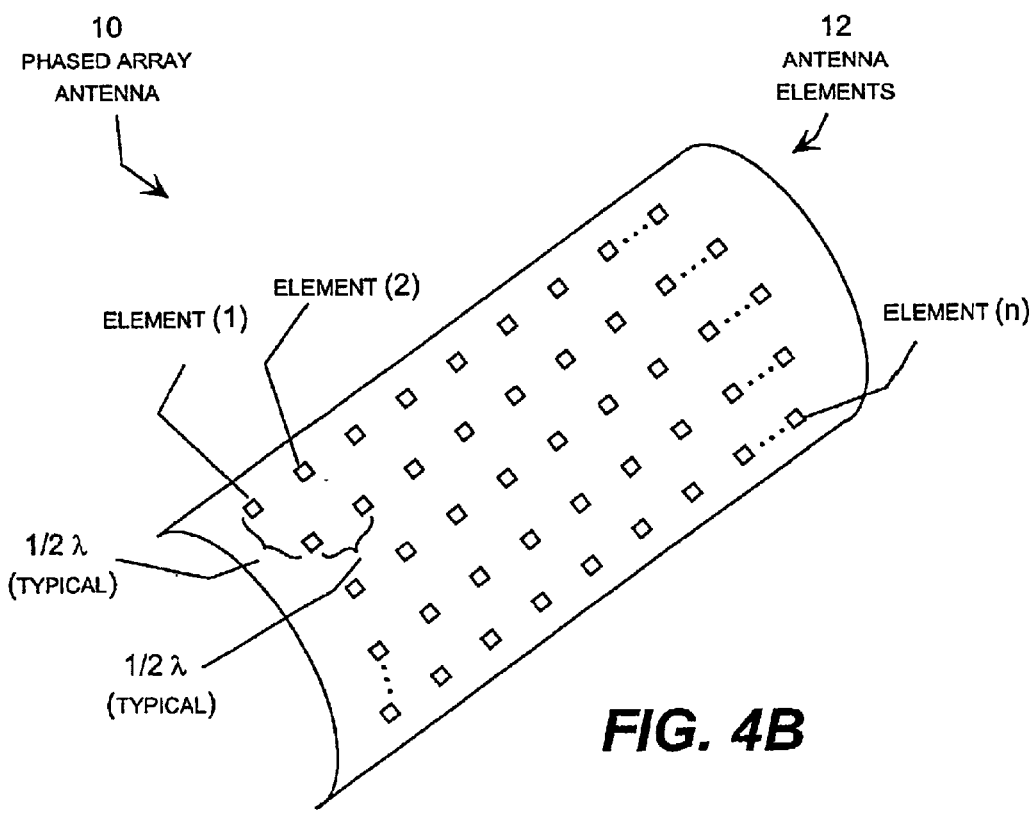
FIG. 4B is a block diagram of a curved phased array antenna configuration.
Figure 4C:
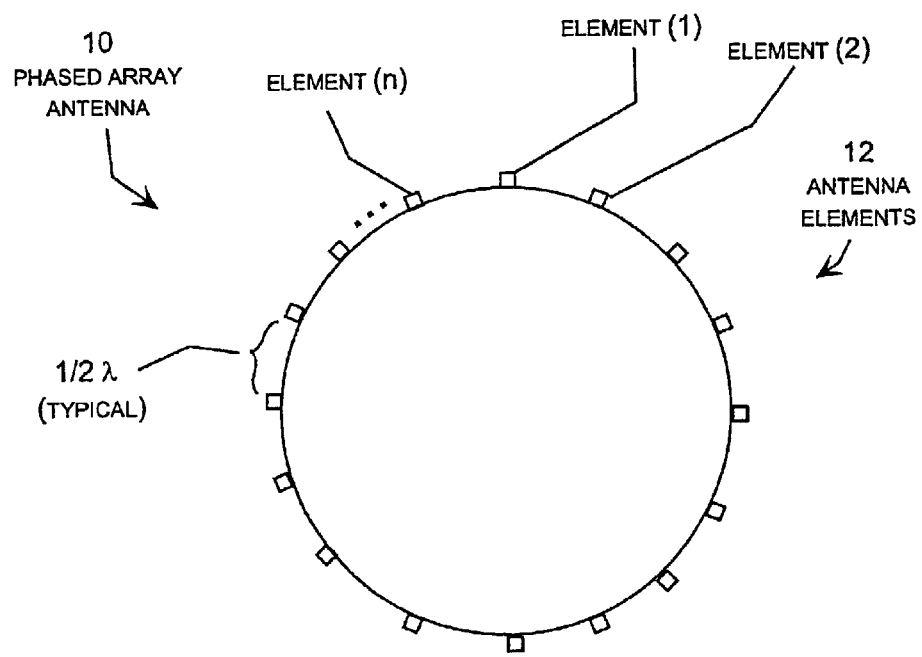
FIG. 4C is a block diagram of a cylindrical phased array antenna configuration.
Figure 4D:
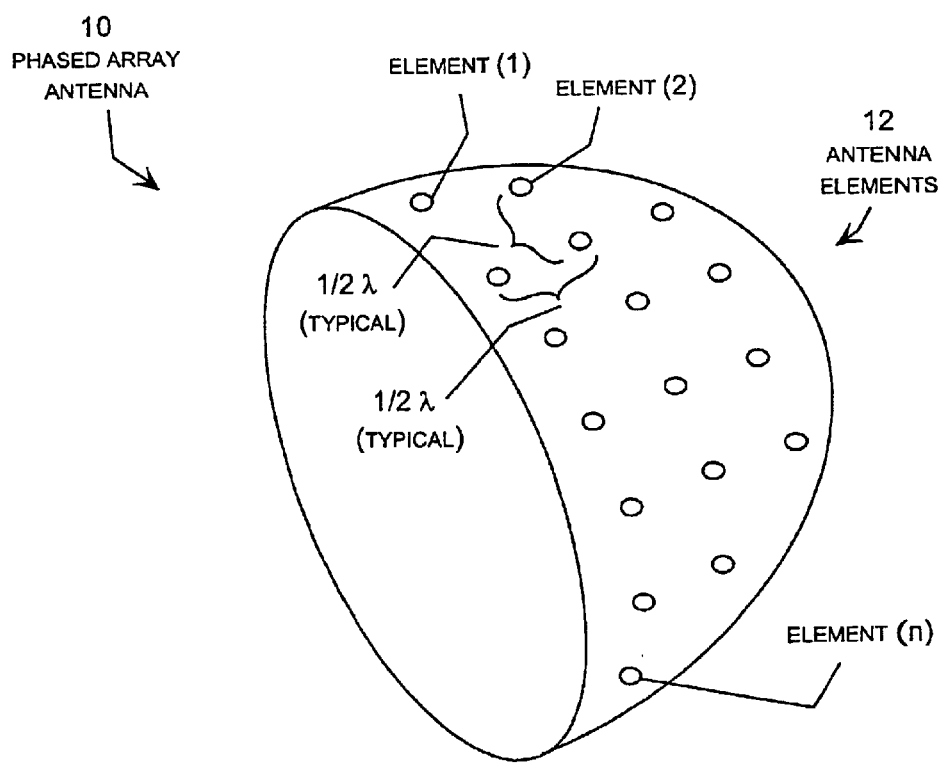
FIG. 4D is a block diagram of a conical phased array antenna configuration.

As noted above, the encoded beam forming methodology of the present invention may be implemented with any type of phased array antenna configuration, and for any type of antenna application. Several of these are illustrated in FIGS. 4A through 4D. Specifically, FIG. 4A shows a planar array that may be well suited to a satellite communication application. FIG. 4B shows a curved array that may be conformal to an airborne platform, such as a manned aircraft, and unmanned aerial vehicle (UAV), an unmanned combat aerial vehicle (UCAV), or the like. FIG. 4C shows cylindrical array that may be well suited to an air traffic control or mobile telephone application, and FIG. 4D shows a conical array that may be mounted to the front of a guided missile or reentry vehicle. It will be appreciated that the invention may be employed in any of these, as well as other antenna systems and applications.

Figures 5, 6:
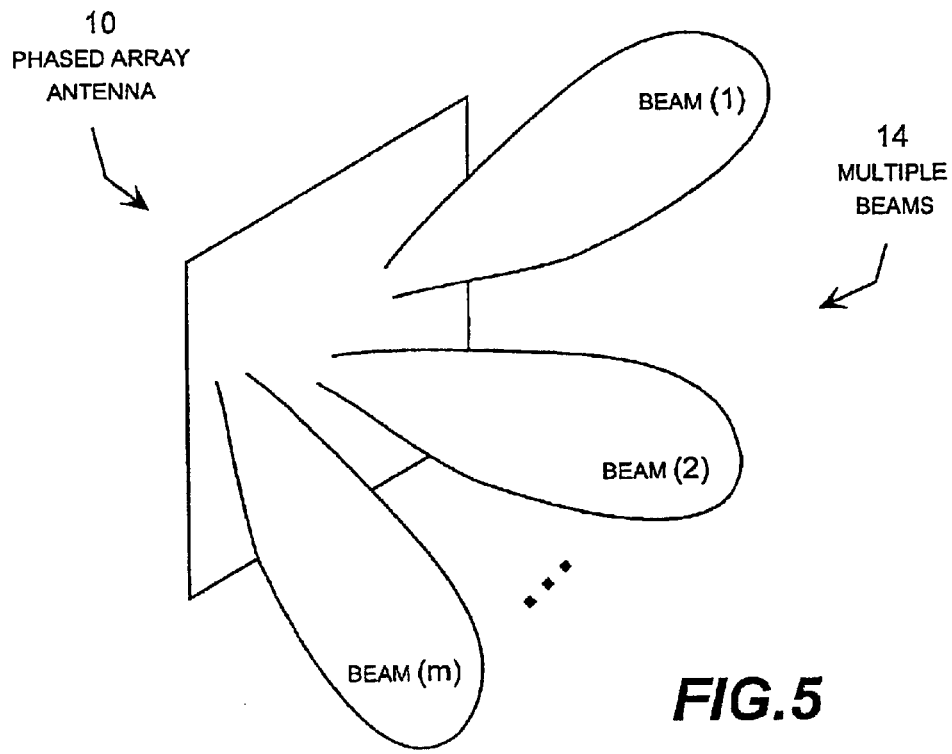
FIG. 5 is a block diagram illustrating multiple beams formed by an antenna.
FIG. 6 is a block diagram illustrating the composition of multiple beams from components received from various antenna elements, and illustrating a corresponding composition of the signals received at various antenna elements as components of multiple beams.

FIG. 5 is a block diagram illustrating multiple beams 14 formed by a phased array antenna 10, which are identified as beam (1), beam (2), and so on through beam (m). In general, the phased array antenna 10 can generate a virtually unlimited number of beams, and can simultaneously distinguish among a number approaching "n" beams, where "n" is the number of antenna elements. However, in a typical application, the number of simultaneous beams "m" is usually somewhat smaller than the number of elements "n." For example, in a typical target acquisition application the number of elements "n" may be 1,000 or 10,000, and the number of beams "m" may be a smaller number, such as ten to 100. Nevertheless, it will be appreciated that the encoded beam forming methodology of the present invention may be implemented with any number of beams "m" and elements "n." It should also be appreciated that the number of beams "m" and elements "n" are parameters used in the mathematical description of the encoded beam forming methodology of the present invention set forth below and in various figures.

In particular, FIG. 6 is a block diagram illustrating the composition of multiple beams from components received from various antenna elements, and illustrating the corresponding composition of the signals received at various antenna elements as components of multiple beams. In general, the beams are referred to with the coefficient "i" referred to as the "beam number," and the antenna elements are referred to with the coefficient "j" referred to as the "element number." As shown in FIG. 6, the beam number "i" extends from one to "m" beams, and the element number "j" extends from one to "n" elements. Using this nomenclature, a particular beam "B(i)" can be expressed as a sum of components from each of the antenna elements, which are expressed as AE(1), AE(2), and so forth through AE(n). Similarly, the signal received at a particular antenna "AE(j)" can be expressed as a sum of components from each of the beams, which are referred to as B(1), B(2), and so forth through B(m). This is shown diagrammatically and mathematically in FIG. 6, which illustrates the physical and mathematical construct of the beam and antenna element equations.

$$B(i) = \sum_{j=1}^{n} AE(j) \quad \text{(beam equation 16)}$$

$$AE(j) = \sum_{i=1}^{m} B(i) \quad \text{(antenna element equation 18)}$$

FIG. 7 illustrates a more specific mathematical expression of the beam equation 16, the antenna element equation 18, and beam parameters 20. Specifically, the beam equation 16 and the antenna element equation 18 may each be expressed as a weighted vector sum of the antenna parameters 20, in which each parameter is represented by a vector with an applied gain and a phase angle.

$$B(i) = \sum_{i=1}^{n} a_{ij} e^{j\phi_{ij}^O}, \text{ where}$$

$a_{11}e^{j\phi_{11}^O}$ = antenna element (1) component of beam (1);

$a_{12}e^{j\phi_{12}^O}$ = antenna element (2) component of beam (1);

$a_{1n}e^{j\phi_{1n}^O}$ = antenna element (n) component of beam (1).

For example, beam (1) can be expressed as shown below, with the other beams defined by changing in beam number:

$$B(1) = a_{11}e^{j\phi_{11}^O} + a_{12}e^{j\phi_{12}^O} + \ldots a_{1n}e^{j\phi_{1n}^O}$$

Similarly, the antenna element signals can be expressed as shown below:

$$AE(j) = \sum_{j=1}^{m} a_{ij} e^{j\phi_{ij}^O} \text{ where}$$

$a_{11}e^{j\phi_{11}^O}$ = beam (1) component of antenna element (1);

$a_{21}e^{j\phi_{21}^O}$ = beam (2) component of antenna element (1);

$a_{m1}e^{j\phi_{m1}^O}$ = beam (m) component of antenna element (1).

For example, the signal for element (1) can be expressed as follows, with the other antenna element signals defined by changing in element number:

$$AE(1) = a_{11}e^{j\phi_{11}^O} + a_{21}e^{j\phi_{21}^O} + \ldots a_{m1}e^{j\phi_{m1}^O}$$

In these equations, the gain (a) and initial phase angle ($\phi°$), which are referred to as the "beam parameters," are sufficient to describe a set of "m" beams formed by as set of "n" antenna elements.

The beam parameters are represented by the following symbols in the mathematical expressions that describe the antenna's operation.

$a_{ij}$=gain applied to antenna element "ij"

$\phi_{ij}^O$ = initial phase shift for antenna element "ij"

Further, the beam parameters themselves can be derived from the antenna physical configuration and the pointing direction of the various beams. Specifically, FIGS. 8 and 9 illustrates the mathematical derivation of the beam parameter from antenna element positions and desired beam pointing directions. The gain (a) applied to each antenna element is set by a physical device controlling the corresponding antenna element in accordance with a desired beam characteristic. For example, the gain may be high if a large return is desired in this particular beam, for example to track a target. Alternatively, the gain may be set to a low level if a small return is desired, for example to avoid receiving a known signal.

The initial phase shift ($\phi°$) is determined by the physical location of the corresponding antenna element and the pointing direction of the desired beam.

$$\phi_{ij}^O = k\vec{r_j} \cdot \vec{R_i}$$

where the "r" represents the location of antenna element "j." In addition, the "R" is a unity vector representing the pointing direction of beam "i," and "k" is a constant. The initial phase angle for the beam "i" component of antenna element "j" can be derived from these parameters as shown below.

$$\vec{r_j} = (x_j, y_j, z_j)$$

$$\vec{R_i} = (\cos\alpha_x, \cos\alpha_y, \cos\alpha_z)$$

$$|\vec{R_i}| = 1$$

$$k = \frac{2\Pi}{\lambda}$$

$$\phi_{ij}^O = \frac{2\Pi}{\lambda}[x_j\cos\alpha_x + y_j\cos\alpha_y + z_j\cos\alpha_z]$$

Figure 10:
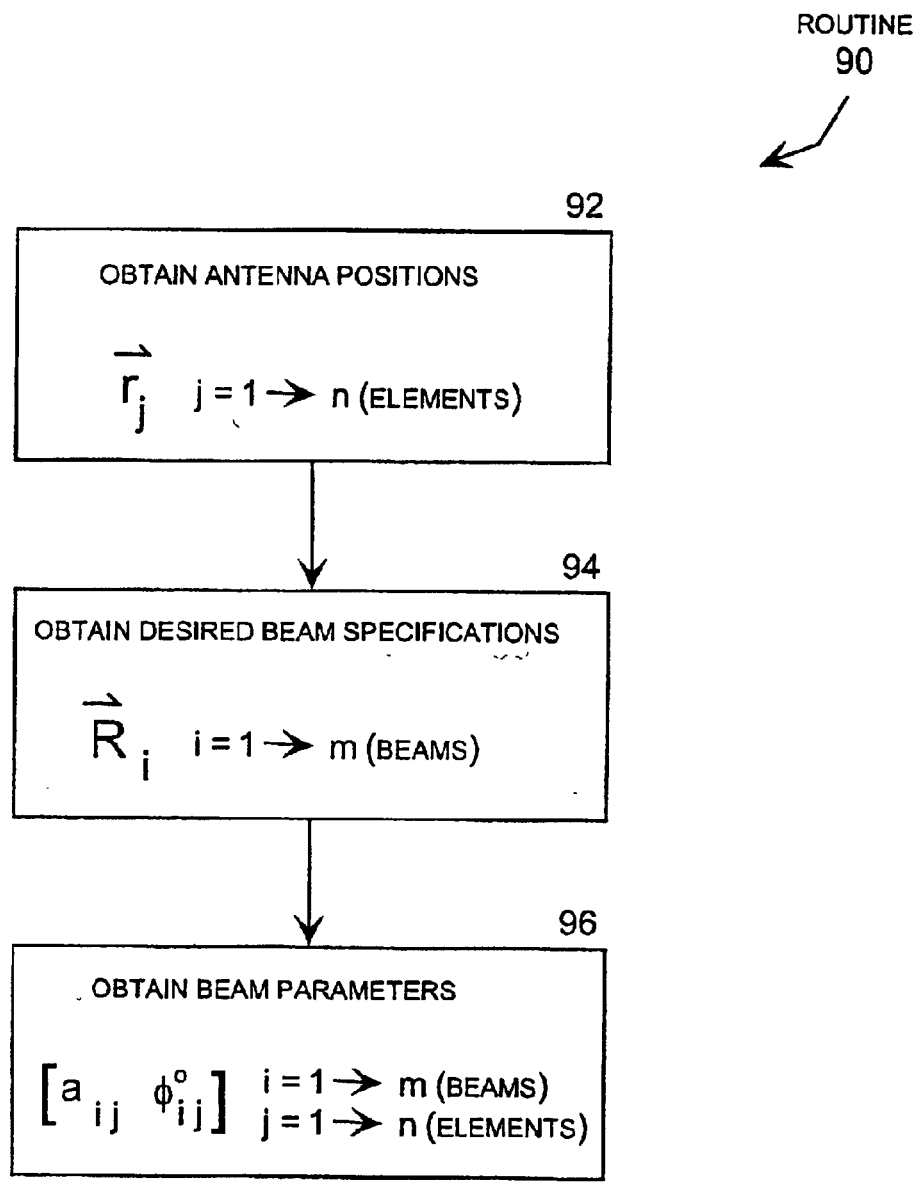
FIG. 10 is a logic flow diagram illustrating a routine for obtaining antenna beam parameter for desired beam sets.

FIG. 10 is a logic flow diagram illustrating a routine 90 for obtaining antenna beam parameters for desired beam sets, which may be performed by a beam selector. In step 92, the beam selector gets the antenna element positions, which are represented by the "r" parameter in the equations shown above. Step 92 is followed by step 94, in which the beam selector gets the desired beam pointing directions, which are represented by the "R" parameter in the equations shown above. Step 94 is followed by step 96, in which the beam selector computes the beam parameters, represented by the "a" and "φ°" parameters in the equations shown above. Thus, the beam selector can compute the beam parameters for any given antenna configuration and beam set. This allows the beam set to be changed on demand, and would also allows the antenna or the antenna configuration to be changed on demand if desired, for example to switch between available antennas or to accommodate changes in the physical configuration of the antenna. This aspect of the antenna system is described in greater detail above with reference to FIGS. 1–8.

FIG. 11 is a block diagram illustrating a generalized phased array antenna system 1100 configured to receive, encode, and decode multiple beams. FIGS. 12 and 13 illustrate two specific examples, one using orthogonal coding and the other using frequency coding, which further expand upon this generalized system 1100, which includes a phased array 1102 with "n" elements configured to receive "m" beams. Each of the "n" antenna elements may be controlled by a dedicated phase and gain control device, resulting in "n" programmable phase and gain control devices 1104. A combiner 1106 then combines the "n" antenna element signals. A sampler 1108, such as an analog-to-digital converter, samples the combined signal at an appropriate rate to receive the information contained within the signal. A decoder 1110 receives the sampled signal and detects coding parameters in the signal to assemble the "m" beams. A displaying, recording and/or further processing device 1112 then displays, records, and/or further processes the "m" beams separately.

As a first specific example, FIG. 12 is a block diagram illustrating a phased array antenna system 1200 configured to receive, encode, and decode multiple beams using orthogonal codes. In this system, the "m" channel codes correspond to an orthogonal code set. In this case, the decoder may be implemented as a conventional CDMA filter 1210, and the orthogonal codes themselves may be supplied to (or received from) the beam forming computer 1214. This is an encoding application in which the CDMA filter identifies orthogonal codes embedded in the combined signal. However, an orthogonal code generator, which may be deployed as a function or part of the beam forming computer, may create the orthogonal codes an supply them to the beam forming computer and a programmable CDMA filter.

To enable the CDMA filter 1210 to separate the beams, a beam forming computer 1214 receives "m" channel codes from the decoder, in this embodiment the CDMA filter 1210. Alternatively, the beam forming computer 1214 may supply the channel codes to the decoder 1210, or a separate channel code generator may generate the codes and supply them to both the beam forming computer 1214 and the decoder 1210. In any case, the beam forming computer 1214 encodes the beams with coding parameters that correspond to the "m" channels, and the decoder 1210 detects these same coding parameters to identify the components of each beam in the combined signal.

In general, the beam forming computer 1214 receives beam parameters, channel codes and a pulse clock signal, which typically corresponds to a radar pulse signal which the antenna system 1200 receives in reflection. The beam forming computer 1214 computes control signals for the phase and gain devices for each pulse, and typically changes the settings of the phase and gain devices for each pulse. Although the control signals are unique to the present invention, all of the individual hardware components described above may conventional.

These control signals, one for each antenna element, are represented by the following symbols:

$\hat{a}_j(t_k)$=total gain applied to element "j" and time "$t_k$"

$\hat{\phi}_j(t_k)$=total gain applied to element "j" and time "$t_k$"

Because the individual hardware components used to implement the antenna system may be conventional, these control signals describe methodology that may be used to implement an orthogonal code embodiment of the present invention. In these equations, the total gain and total phase shift can be represented by a vector with a magnitude equal to the total gain and an angle equal to the total phase shift. As such, they may be expressed in terms of in-phase and quadrature components as shown below, where "I" represents the in-phase component and "Q" represent the quadrature component.

$$\hat{a}_j(t_k) = \sqrt{I_j^2(t_k) + Q_j^2(t_k)}$$

$$\hat{\phi}_j(t_k) = \tan^{-1}\left(\frac{I_j(t_k)}{Q_j(t_k)}\right)$$

Moreover, because the total gain and total phase angle for each element is the vector sum of the beam components for the corresponding element, the in-phase and quadrature components can each be expressed vector projection sums, as shown below.

$$I_j(t_k) = \sum_{i=1}^{m} a_{ij}\cos[\phi_{ij}^o + \delta_i] \text{ for } j = 1 \to n \text{ elements}$$

$$Q_j(t_k) = \sum_{i=1}^{m} a_{ij}\sin[\phi_{ij}^o + \delta_i] \text{ for } j = 1 \to n \text{ elements}$$

$\delta_1, \delta_1 \ldots \delta_m$=CDMA codes (channels)
$I_j(t_k)$=in-phase component
$Q_j(t_k)$=quadrature component In these equations, the beam parameters "a" and "φ°" are those described previously with reference to FIG. 8, and the coding parameter "δ" is the CDMA coding parameter, which typically represents either a digital "1" or "0" represented by a zero degree (0°) phase shift or a one-hundred-eighty degree (180°) phase shift. For example, "δ=o°" may represent a digital "1" and "δ=180°" may represent a digital "0." Further, consecutive "δ" values over time result in a digital data stream that defines a CDMA encoded signal. Accordingly, it will be appreciated that the size of the CDMA code set, such as 32 bits, represents a minimum number of pulses required to transmit detectable data using this technique, and a modulo parameter for receiving data in frames. This minimum data sample size or frame is also referred to as the "dwell," which may be thought of as the repeat or frame size for the antenna system control signal.

The CDMA filter 1210, which is synchronized to detect the CDMA codes created by the "δ" parameters, uses the detected digital data to separate the "m" beams from the combined signal received from the sampler 1208. That is, the CDMA filter processes the combined signal through various CDMA filter channels, which each detect a non-zero response only for the data expressed in its corresponding CDMA code format. This allows the CDMA filter 1210 to extract "m" beams, each encoded with a corresponding CDMA code set, by processing the same combined signal received from the sampler 1208 through "m" orthogonal code filters. The digital data, once received and separated into beams as described above, may be subsequently subjected to any type of post-receipt processing, such as further decoding, error detecting, integration, and so forth.

As a second specific example, FIG. 13 is a block diagram illustrating a phased array antenna system 1300 configured to receive, encode, and decode multiple beams using frequency channels. This system is similar to the orthogonal code (CDMA) encoding application described above with reference to FIG. 12, except that frequency codes are used instead of orthogonal codes as the data signal. In this embodiment, the decoder may be conveniently implemented using a Doppler filter 1310, and phase shifts that emulate the Doppler phase shift received in the signals returning from moving targets are embedded into the received beams through the control signals applied to the antenna elements. These phase shifts, which are embedded into the beams through the coding parameters applied to the antenna control signals, are then used by the Doppler filter to identify the beam components and assemble into the separate beams. Note that the particular phase shifts, and the corresponding emulated Doppler frequencies may be arbitrarily assigned so long as they fall within the frequency range of the Doppler filter. Therefore, the coding parameters may be selected or set by the Doppler filter 1310, by beam forming computer 1314, by a separate code selector, or by some other device. The only requirement is the decoder, in this example the Doppler filter 1310, be operative to detect the coding parameters. Once the coding parameters have been detected, any suitable method of beam correlation, assembly, and further processing may be employed on the decoding end of the system.

In order to allow the Doppler filter 1310 to detect the coding parameters, they muse emulate the Doppler frequency shifts which the filter is configured to detect. Accordingly, the phase shift applied to identify a particular beam in incremented each pulse cycle to emulate a frequency shift, which the Doppler filter 1310 detects in its usual manner. That is, the conventional time domain data accumulation, Fast Fourier Transform (FFT), and frequency division capabilities of a conventional Doppler filter 1310 can be used to separate the beams, provided that the phase shifts used to identify the beams are regularly incremented to emulate frequency shifts that the Doppler filter readily detects. Of course, other coding techniques that do no rely on emulating the Doppler effect using coding parameters may be devised to implement the beam encoding technique of the present invention. For example, the orthogonal coding technique described above did not increment the coding parameters in time to create a desired frequency shift. Therefore, it will be understood that other coding techniques may be implemented in a similar manner by modifying the CDMA and Doppler filter examples described here in detail to accommodate the selected beam coding strategy.

Figure 14:
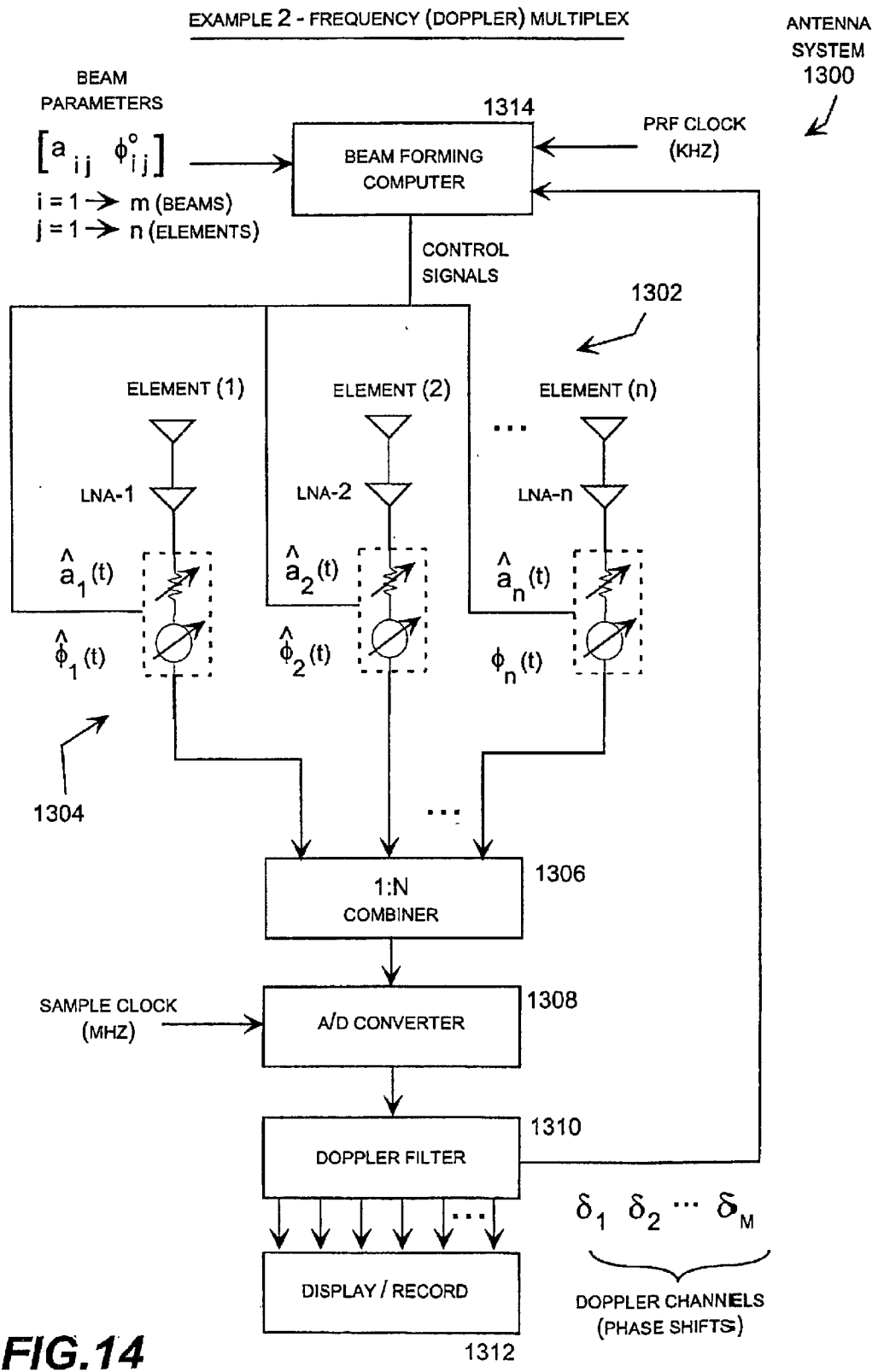
FIG. 14 is a schematic diagram of a phased array antenna system configured to receive, encode, and decode multiple beams using frequency channels.

To further illustrate the frequency coding embodiment that uses a Doppler filter as a beam decoder, FIG. 14 is a schematic diagram of the phased array antenna system 1300 shown in FIG. 13, which is configured to receive, encode, and decode multiple beams using regularly incremented phase shifts that produce frequency shifts that are detected by a conventional Doppler filter. As shown schematically, each antenna element includes a single phase and gain device 1304 that receives a control signal from the beam forming computer 1314. These control signals, one for each antenna element, are represented by the following symbols:

$\hat{a}_j(t_k)$=total gain applied to element "j" and time "$t_k$"

$\hat{\phi}_j(t_k)$=total gain applied to element "j" and time "$t_k$"

Again in this example, because the individual hardware components used to implement the antenna system may be conventional, these control signals describe the methodology that may be used to implement a frequency coding embodiment of the present invention. In these equations, the total gain and total phase shift can be represented by a vector with a magnitude equal to the total gain and an angle equal to the total phase shift. As such, they may be expressed in terms of in-phase and quadrature components as shown below, where "I" represents the in-phase component and "Q" represent the quadrature component.

$$\hat{a}_j(t_k) = \sqrt{I_j^{2(t_k) + Q_j}}.$$

$$\hat{\phi}_j(t_k) = \tan^{-1}\left(\frac{I_j(t_k)}{Q_j(t_k)}\right)$$

Moreover, because the total gain and total phase angle for each element is the vector sum of the beam components for the corresponding element, the in-phase and quadrature components can each be expressed vector projection sums, as shown below.

$$I_j(t_k) = \sum_{i=1}^{m} a_{ij}\cos[\phi_{ij}^o + k\delta_i] \text{ for } j = 1 \to n \text{ elements}$$

$$Q_j(t_k) = \sum_{i=1}^{m} a_{ij}\sin[\phi_{ij}^o + k\delta_i] \text{ for } j = 1 \to n \text{ elements}$$

$\delta_1, \delta_1 \ldots \delta_m$=Doppler phase shifts (channels); $\delta_1$=0 (typical);

$I_j(t_k)$=in-phase component $Q_j(t_k)$=quadrature component

In these equations, the beam parameters "a" and "$\phi°$" are those described previously with reference to FIG. 8, and the coding parameter "$\delta$" is the coding parameter described previously with reference to FIG. 11. In this embodiment, the coding parameter "$\delta$" is used to create a phase shift that is regularly incremented by the time interval "k" to create a frequency shift that can be detected by a conventional Doppler filter. In the orthogonal embodiment, by contrast, the coding parameter "$\delta$" represents an orthogonal coding parameter, which is not multiplied by the time interval. Instead, over time the orthogonal coding parameter defines orthogonal codes that the orthogonal code filter detects to identify the beam components. Otherwise, the orthogonal coding embodiment, and other suitable coding strategies, may be implemented in a manner similar to that shown above for the frequency coding embodiment.

FIG. 15 illustrates the mathematical expression of the control signals used to drive the antenna system of FIG. 14. In particular, FIG. 15 shows the vector projection sums forming the in-phase and quadrature components of the control signals for each antenna element "j". That is, the second parameter in the coefficients representing the antenna element number "j" is changed from "1" to "n" to obtain the in-phase and quadrature components of the control signals for the corresponding antenna element.

$$I_j(t_k) = a_1 j\cos[\phi_1^o j + k\delta_1] + a_2 j\cos[\phi_2^o j + k\delta_2] + \ldots a_m j\cos[\phi_m^o j + k\delta_m]$$

$$Q_j(t_k) = a_1 j\sin[\phi_1^o j + k\delta_1] + a_2 j\sin[\phi_2^o j + k\delta_2] + \ldots a_m j\sin[\phi_m^o j + k\delta_m]$$

Figure 16:
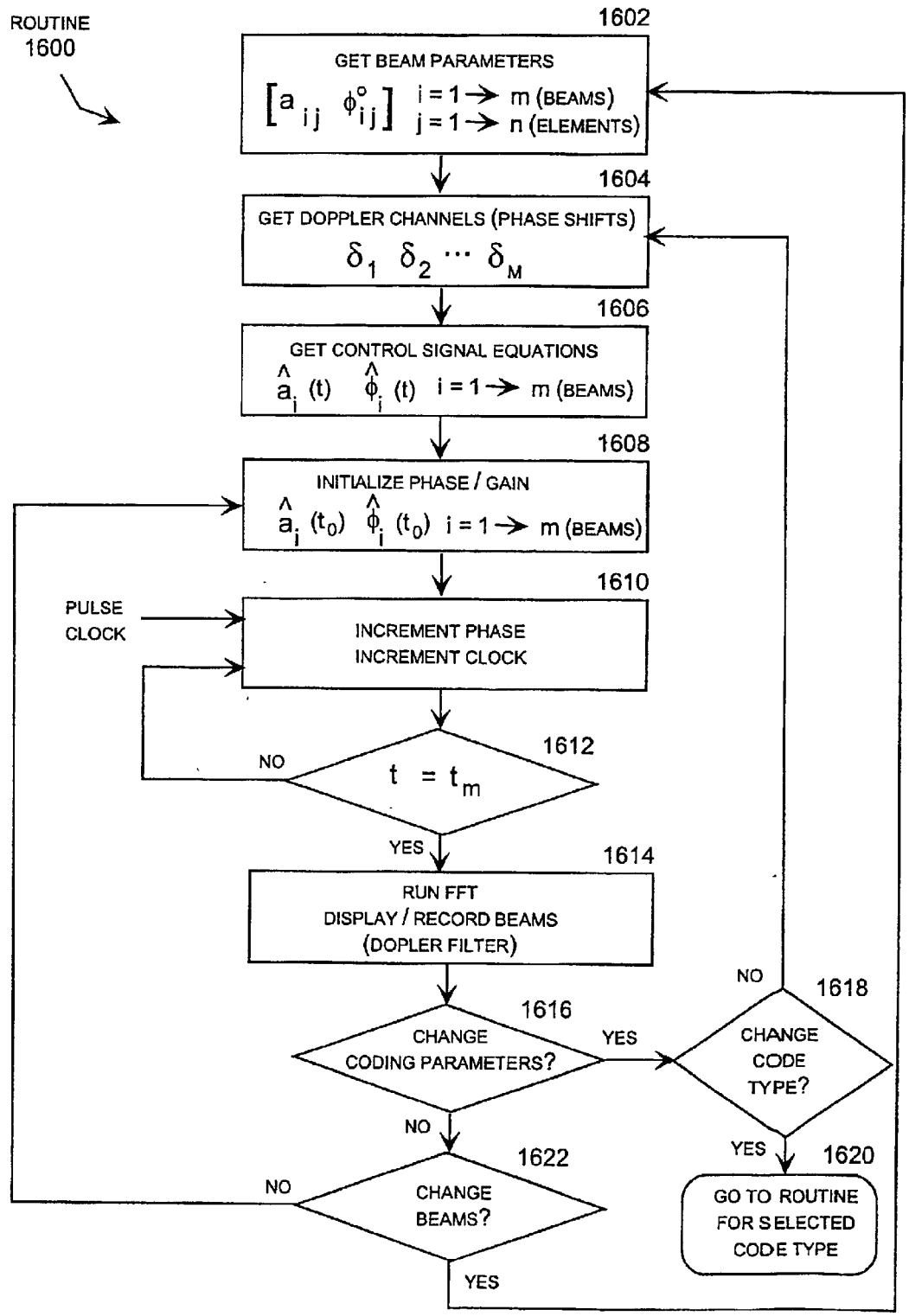
FIG. 16 is a logic flow diagram illustrating a routine for operating a multi-beam phased array antenna system using frequency channels.

FIG. 16 is a logic flow diagram illustrating a routine 1600 for operating a multi-beam phased array antenna system, such as the system shown in FIG. 14, using frequency codes. In step 1602, the beam forming computer 1314 gets beam parameters, as described previously with reference to FIG. 9. Step 1602 is followed by step 1604, in which the beam forming 1314 computer gets frequency codes, such as codes corresponding to frequency channels employed by the Doppler filter 1310. Step 1604 is followed by step 1606, in which the beam forming computer 1314 gets control signal equations, such as those described with reference to FIG. 15. Step 1606 is followed by step 1608, in which the beam forming computer 1314 initializes the phase and gain controllers 1304, which control the gain and phase shift for the various antenna elements 1302 of the phased array antenna system 1300. Step 1608 is followed by step 1610, in which the beam forming computer 1314 receives a pulse signal from a pulse clock, which typically corresponds to a radar pulse signal that produces reflections received by the antenna system to detect targets within the monitored volume. The beam forming computer 1314 increments a pulse clock and increments the phase settings of the antenna phase and gain control devices 1304 for each pulse.

Step 1610 is followed by step 1612, in which the beam forming computer 1314 determines whether the pulse clock has been incremented through "m" pulses, which represents the "dwell" or minimum repeat frame size for the system. More specifically, the "dwell" size "m" represent the minimum number of pulse iterations required to create a time domain data set for the FFT ("Fast Fourier Transform") program employed by the Doppler filter 1310 to detect the frequencies encoded into the "m" beams. This is analogous to the CDMA code set size in the CDMA example described with reference to FIG. 12 in that it represents the minimum data set or frame size required to transmit detectable information through the selected coding technique. If the pulse clock has not been incremented through "m" pulses, the "NO" branch loops back to step 1610 until the phase and gain controllers 1304 have been incremented through "m" iterations. If the pulse clock has been incremented through "m" pulse iterations, the "YES" is followed to step 1614, in which the Doppler filter 1310 runs the FFT algorithm on the received time domain data for the dwell, which produces the "m" beams sorted by frequency.

Step 1614 is followed by step 1616, in which the beam forming computer 1314 determines whether to change the coding parameters. If a change in coding parameters is indicated, the "YES" branch is followed to step 1618, in which the beam forming computer 1314 determines whether to change the coding type. If a change in coding type is indicated, the "YES" branch is followed to step 1620, in which the beam forming computer goes to a routine for the selected coding type, such as the CDMA coding technique described previously with reference to FIG. 12, and implements the selected coding type. If a change in coding type is not indicated, the "NO" branch loops back to 1604, in which the beam forming computer 1314 selects new Doppler frequency channels and implements the frequency coding technique for another dwell period with the selected coding Doppler frequency channels.

Referring again to step 1616, if a change in coding parameters is not indicated, the "NO" branch is followed to step 1622, in which the beam forming computer 1314 determines whether to change the beam pattern. If a change in the beam pattern is not indicated, the "NO" branch is followed to step 1608, in which the beam forming computer 1314 implements a control cycle for another dwell period using the previously selected beam parameters. If a change in the beam pattern is indicated, the "YES" branch is followed to step 1602, in which the beam forming computer 1314 gets new beam parameters and implements a control cycle for another dwell period using the new beam parameters. Thus, it will be appreciated that routine 1600 allows the antenna system 1300 to use various beam patterns, coding techniques, and code sets to separate "m" beams from the combined signal received the multi-beam phased array antenna system 1300.

Figure 17:
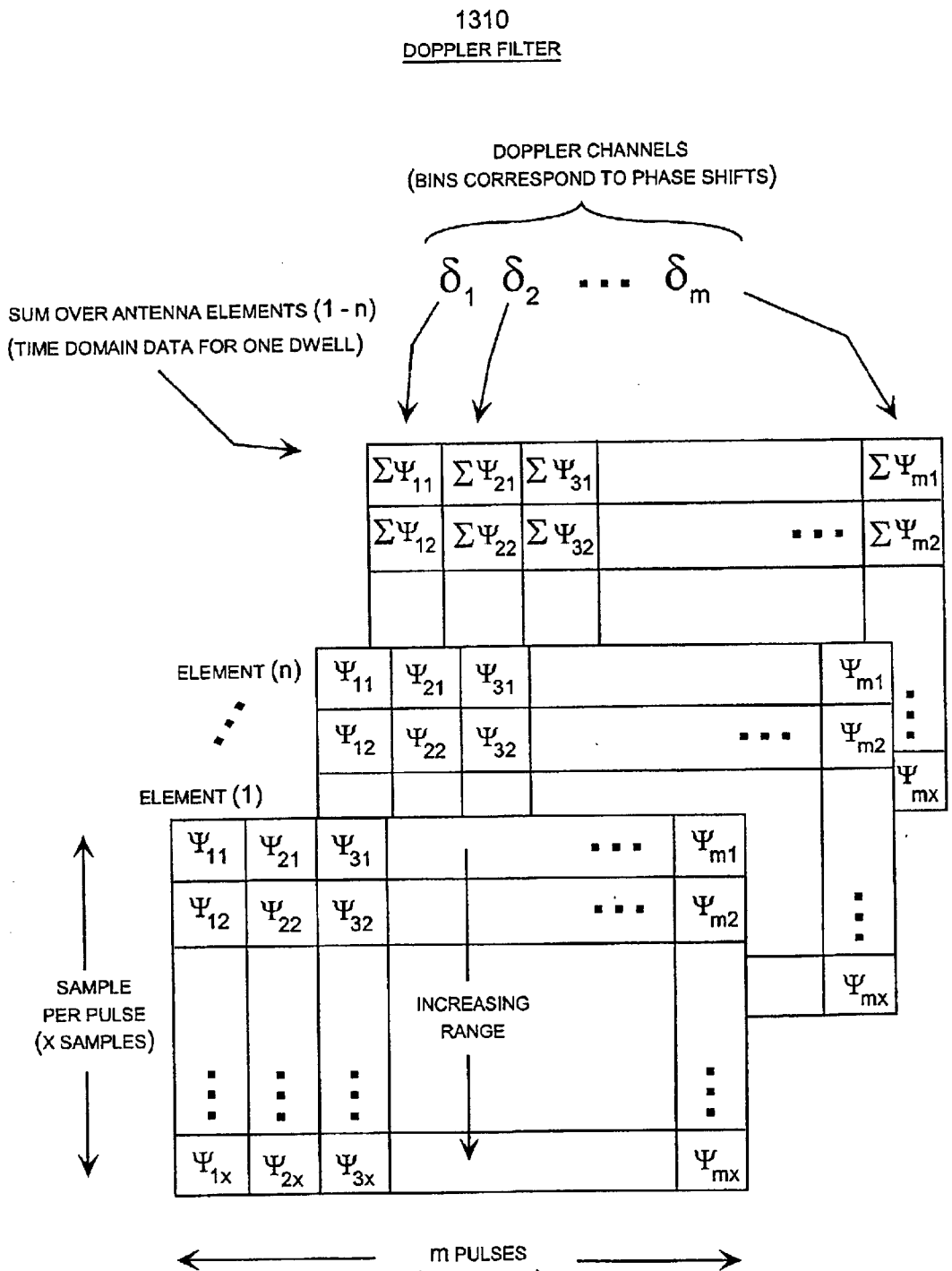
FIG. 17 is a block diagram illustrating a frequency filter used to detect and separate multiple beams received by a multi-beam phased array antenna system using frequency channels.

FIG. 17 is a block diagram illustrating the operation of the Doppler filter 1310, which is used to detect and separate multiple beams received by the multi-beam phased array antenna system 1300 using frequency coding. As represented by a column of data in the illustrated table for element (1), each antenna element receives a series of "x" samples of data for a corresponding pulse. That is, the sampling A/D converter 1308 (typically operating in the MHz range) receives "x" samples for each setting of the phase and gain control devices 1302, which are changed at the pulse clock rate (typically operating in the kHz range). Successive samples therefore represent successive returns from a corresponding pulse from increasing range from the antenna system 1300. This range data for each pulse iteration forms a column of "x" time domain samples for the corresponding pulse, whereas successive pulses of data form successive columns. Thus, the data for a complete dwell of "m" pulses fills an "x" by "m" time domain data table for each antenna element, as illustrated by the table for element (1) shown in FIG. 17.

Further, the Doppler filter 1310 actually receives a combined signal, which represents the vector sum of the time domain data described above for all of the antenna elements. This is illustrated in FIG. 17 as the summation table shown at the rear of the data tables for the "n" antenna elements, which represents the vector sum of the time domain data produced by all of the antenna elements. The Doppler filter accumulates this time domain data over the dwell period by collecting the data for each of the "m" pulses in a bin corresponding to the "m" Doppler frequency channels emulated by the coding parameters. Once a complete set of time domain data for a dwell has been organized in this manner, the Doppler filter 1310 runs the FFT algorithm on the time domain data, which transforms the data into the frequency domain with each beam sorted into its corresponding channel.

Figure 18:
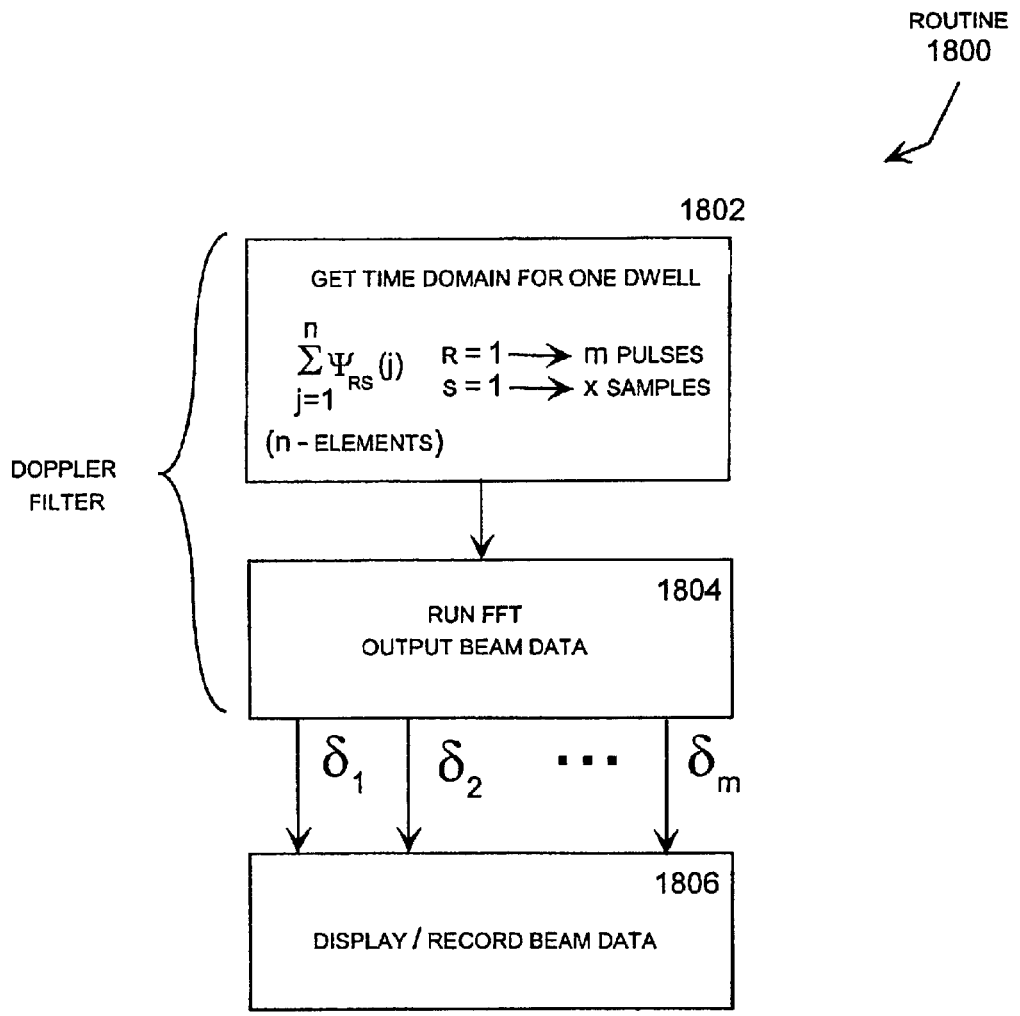
FIG. 18 is a logic flow diagram for operating a frequency filter to detect and separate multiple beams received by a multi-beam phased array antenna system using frequency channels.

More specifically, FIG. 18 is a logic flow diagram illustrating a routine 1800 for the Doppler filter 1310. In step 1802, the Doppler filter 1310 accumulates the time domain data for one dwell, as described above, in which the bin for each of the "m" Doppler channels receives "x" samples representing the vector sum of the returns received from the antenna elements for a corresponding pulse. Thus, the Doppler filter 1310 accumulates the following "x" by "m" time domain data set for the phased array antenna system 1300, which represents the sum of the time domain data for all of the antenna elements, as illustrated by FIG. 17.

$$\sum_{j=1}^{n} \Psi_{RS}(j)$$

where "r"=1 to "m" pulses;
where "s"=1 to "x" samples; and
where "j"=1 to "n" antenna elements Step 1802 is followed by step 1804, in which the Doppler filter 1310 runs the FFT algorithm on the accumulated time domain data. Specifically, the FFT algorithm is typically run for each row or "range cell" of the time domain data set. This allows the FFT algorithm to transforms the time domain data for each range cell into the frequency domain with each beam sorted into its corresponding channel. Step 1804 is followed by step 1806, in which an appropriate display and/or recording device displays or records the separate beams. Routine 1800 is repeated for each dwell of data to be separated into beams.

FIG. 19 is a table illustrating a look-up method for storing control signals for operating the antenna system 1300 used to detect and separate multiple beams received by a multi-beam phased array antenna system using frequency coding. In particular, because the Doppler frequency channels and CDMA orthogonal code channels may be determined in advance, the control signals for a dwell can be computed in advance for any desired set of beams. Therefore, the control signals may be saved in a look up table, such as that show in FIG. 19, to enable antenna control at high data rates with low computational overhead.

To further illustrate the elements of the look up table for the frequency coding embodiment, FIG. 20 illustrates the mathematical expression of the control signals for initializing (i.e., time to) the antenna system, FIG. 21 illustrates the mathematical expression of the control signals for a first time interval (i.e., time $t_1$), FIG. 22 illustrates the mathematical expression of the control signals for a second interval (i.e., time $t_2$), FIG. 23 illustrates the mathematical expression of the control signals for third time interval (i.e., time $t_3$), and FIG. 24 illustrates the mathematical expression of the control signals for an arbitrary time interval (i.e., time $t_x$).

FIG. 25 illustrates a look-up table for storing the phase shift parameters for use in generating the control signals expressed above in FIGS. 20 through 24. FIG. 26 is a table illustrating one particular example of a set of phase shift parameters for an antenna system that may be used to detect and separate multiple beams received by a multi-beam phased array antenna system using frequency coding and a Doppler filter. In this particular alternative, a single emulated Doppler phase shift "Δ" is utilized, with different channels utilizing multiples of this basic phase shift. This single emulated Doppler phase shift is thus used to create all of the coding parameters for the "m" beams. Specifically, a first beam will be appear to the carrier frequency (i.e. no Doppler shift), a second beam will be shifted to the frequency created by one-Δ phase shift repeated at the pulse rate, a second beam will be shifted to the frequency created by one-Δ phase shift repeated at the pulse rate, a third beam will be shifted to the frequency created by two-Δ phase shift repeated at the pulse rate, and so on. Thus, it should be apparent that the coding parameter Δ should be selected so that the desired number of "m" beams can be received within the frequency range of the Doppler filter. Many other techniques for selecting the coding parameters may become apparent to those skilled in the art using the basic beam encoding approach of the present invention, and this particular example is no more than a simple alternative selected for its descriptive simplicity.

It should also be appreciated that orthogonal coding and Doppler techniques may be combined in a particular application to perform beam separation and target speed detection. For example, orthogonal coding may be used to encode the beams for separation, while conventional Doppler filtering may be used to detect the speed of targets within the various beams. Similarly, frequency coding may be used to encode the beams for separation, while conventional Doppler filtering may be used to detect the speed of targets within the various beams. In the former case, the sampling rate used for beam separation should be sufficiently fast to make the Doppler effect caused by the speed of the targets to insignificant during the beam separation process. Then, after they have been separated, a slower sampling rate appropriate to detecting the speed of the targets using a Doppler filter may be used to detect the speed of the targets within the individual beams.

FIG. 27 is a schematic diagram of an alternative phased array antenna system 2700 configured to receive, encode, and decode multiple beams. This system includes "n" antenna elements that each include a dedicated set of "m" phase and gain control devices. Each antenna element includes similar antenna element hardware, which is enumerated only for antenna element (1) for descriptive convenience. Specifically, antenna element (1) includes a 1:M splitter 2702 to feed the received signal through "m" phase and gain control devices 2704, which are each controlled to receive a desired beam. That is, the coding parameter for each beam is embedded into the control signal for the corresponding phase and gain control device. The resulting "m" signals are, in turn combined (i.e., superimposed) by a 1:M combiner 2706 to create a combined signal. The "n" combined signals from antenna elements (1) through (n) are further combined (i.e., superimposed) by a 1:N combiner 2708 into a combined signal for the entire antenna array. This combined signal is then sampled by an A/D converter 2710, and the digital signal is supplied to a Doppler filter 2712.

It should be appreciated that the antenna system 2700 is similar to the antenna system 1300 described with reference to FIGS. 13 and 14, and may be controlled in a similar manner to encode and separate the beams, except that each antenna element of the antenna system 2700 includes a separate phase and gain control device for each beam (i.e., "m" phase and gain control devices per antenna element), whereas the antenna system 1300 includes only a single phase and gain control device for each antenna element. It should also be appreciated that the combined signal produced by the combiner 2706 is the vector sum of the "m" signals produced by the "m" phase and gain control devices 2704 in the antenna system 2700. Therefore, the "m" phase and gain control devices can be replaced in the antenna system 1300 by computing the vector sum of the of the "m" phase and gain control vectors for the "m" beams, and applying this resultant vector (i.e., total gain and total phase shift) directly to a single phase and gain control device. This is the control technique used in the antenna system 1300, which allows a single gain and phase control device to create the same signal that is created by "m" phase and gain control devices, which are combined together after they have been received in separate hardware channels in the antenna system 2700.

FIG. 28 is a schematic diagram of a prior art phased array antenna system configured to receive, encode, and decode multiple beams. This system is similar to the antenna system 2800 described with reference to FIG. 27, except that each of the "m" beams has a dedicated combiner, A/D converter, and Doppler filter. This represents a "brute force" approach in which the "m" beams are each formed with dedicated antenna hardware rather then the coding technique of the present invention. The transition from the antenna system 2800 shown in FIG. 28 to the antenna system 2700 shown in FIG. 27 illustrates that the beam forming technique of the present invention allows a single set of beam forming hardware (i.e., combiner, A/D converter, and Doppler filter) to replace "m" sets of similar beam forming hardware in the prior-art system 2800. The transition from the antenna system 2700 shown in FIG. 27 to the antenna system 1300 shown in FIG. 13 further illustrates that the encoded beam forming technique of the present invention also allows a single antenna phase and gain control device to replace "m" phase and gain control devices for each antenna element. Nevertheless, both the antenna system 1300 and the antenna system 2700 embody a variation of the encoded beam forming technique of the present invention.

In view of the foregoing, it will be appreciated that present invention provides an improved system for generating multiple beams with a phased array antenna system. It should be understood that the foregoing relates only to the exemplary embodiments of the present invention, and that numerous changes may be made therein without departing from the spirit and scope of the invention as defined by the following claims.

The invention claimed is:

1. A method for operating a phased array antenna system, comprising the steps of:
   receiving propagating energy at multiple antenna elements;
   setting control signals for forming the received energy into multiple beams;
   embedding coding parameters into the control signals;
   applying the encoded control signals to at least one phase and gain control device associated with each antenna element to form multiple encoded beams;
   combining the encoded beams into a combined signal; and
   decoding the combined signal to separate the beams.

2. The method of claim 1, further comprising a step selected from the group consisting of further processing, displaying or recording a representation of each beam separately.

3. The method of claim 1 repeated for a plurality of desired beam sets.

4. The method of claim 1, in which the control signal for each antenna element is applied to a single phase and gain control device dedicated to the corresponding antenna element.

5. The method of claim 1, in which each antenna element includes a plurality of phase end gain control devices, with one phase and gain control device dedicated to each beam, and the control signal for each antenna element is applied to the plurality of phase and gain control devices associated with the corresponding antenna element, such that a control signal component for each beam is applied to a corresponding phase and gain control device.

6. The method of claim 1, in which the encoded beams are combined in a single beam forming combiner.

7. The method of claim 1, wherein:
   the step of forming the received energy into multiple beams comprises defining a control signal for each antenna element, in which each control signal comprises a beam component corresponding to each beam;
   the step of encoding the beams comprises embedding a coding parameter into each beam component identifying the corresponding beam, in which the coding parameter for a corresponding beam is the same for each antenna element; and
   the step of decoding the combined signal to separate the beams comprises detecting the coding parameters and combining the beam components from each antenna element having similar coding parameters.

8. The method of claim 7, wherein the step of combining the encoded beams into a combined signal comprises the steps of:
   computing an in-phase component for the control signal for each antenna element comprising a sum of in-phase beam components for the corresponding antenna element;
   computing a quadrature component for the control signal for each antenna element comprising a sum of quadrature beam components for the corresponding antenna element; and
   computing a total gain and a total phase shift for each antenna element from the corresponding in-phase and quadrature components.

9. The method claim 8, wherein:
   the in-phase beam components for each antenna element include an in-phase component corresponding to each beam; and
   the quadrature beam components for each antenna element include an in-phase component corresponding to each beam.

10. The method of claim 1, wherein:
    the beams are encoded with frequencies by repeatedly incrementing phase shifts embedded in the control signals; and
    the beams are decoded with a frequency filter.

11. The method of claim 9, wherein the step of encoding the beams comprises embedding a coding parameter into the in-phase and quadrature beam components, in which the coding parameter for a corresponding beam is the same for each antenna element.

12. The method of claim 11, wherein:
    the beams are encoded by embedding repeatedly incrementing phase shifts embedded into the in-phase and quadrature beam components; and
    the beams are decoded with a frequency filter.

13. The method of claim 1, wherein the beams are encoded with orthogonal codes and decoded with an orthogonal code filter.

14. The method of claim 11, wherein:
    the beams are encoded by embedding orthogonal codes into the in-phase and quadrature beam components; and
    the beams are decoded with an orthogonal code filter.

15. A computer storage medium comprising computer executable instructions for performing the method of claim 1.

16. An apparatus configured to perform the method of claim 1.

17. A computer storage medium comprising computer executable instructions for performing the method of claim 11.

18. An apparatus configured to perform the method of claim 11.

19. A multi-beam phased array antenna system comprising:
   a plurality of antenna elements;
   one or more phase and gain control devices associated with each antenna element;
   a beam forming combiner creating a combined signal from signals received from the antenna elements;
   a beam forming computer configured to generate control signals to drive the phase and gain control devices to create multiple beams, in which each beam is identified by a coding parameter embedded in the control signals; and
   a filter configured to receive the combined signal, detect the coding parameters, and separate the beams using the coding parameters.

20. The antenna system of claim 19, comprising a single phase and gain control device associated with each antenna element.

21. The antenna system of claim 20, wherein:
   the control signal for each antenna element comprises a beam component corresponding to each beam;
   the coding parameter for a corresponding beam is the same for each antenna element; and
   the beams are separated by detecting the coding parameters and combining the beam components from each antenna element having similar coding parameters.

22. The antenna system of claim 21, wherein:
   the control signal for each antenna element comprises an in-phase component defined by a sum of in-phase beam components for the corresponding antenna element;
   the control signal for each antenna element comprises a quadrature component defined by a sum of quadrature beam components for the corresponding antenna element; and
   the control signal for each antenna element comprises a total gain and a total phase shift for the antenna element based on the in-phase and quadrature components for the corresponding antenna element.

23. The antenna system of claim 22, wherein:
   the in-phase beam components for each antenna element include an in-phase component corresponding to each beam; and
   the quadrature beam components for each antenna element include an in-phase component corresponding to each beam.

24. The antenna system of claim 23, wherein the coding parameters are embedded into the in-phase and quadrature beam components.

25. The antenna system of claim 24, wherein:
   the coding parameters represent frequencies; and
   the filter is a frequency filter.

26. The antenna system of claim 24 wherein:
   the coding parameters are orthogonal codes; and
   the beams are decoded with an orthogonal code filter.

27. The antenna system of claim 24, further comprising a beam selector configured to identify desired beam sets, and wherein the beam forming computer is configured to generate control signals to drive the phase and gain control devices to create multiple beams for each desired beam set.

28. The antenna system of claim 24, further comprising a code selector configured to identify desired coding parameter sets, and wherein the beam forming computer is configured to generate control signals to drive the phase and gain control devices to create multiple beams for each desired coding parameter set.

29. The antenna system of claim 28, wherein the coding parameter sets include orthogonal coding and frequency coding code sets.

30. A multi-beam phased array antenna system comprising:
   a plurality of antenna elements;
   a phase and gain control device for each antenna element;
   a beam forming combiner creating a combined signal from the signals received from the antenna elements;
   a code selector configured to identify desired coding parameter sets,
   a beam selector configured to identify desired beam sets;
   a beam forming computer configured to generate control signals to drive the phase and gain control devices to create the multiple beams for a desired beam set, in which each beam is identified by a coding parameter embedded into the control signal using a desired code set; and
   a filter configured to receive the combined signal, detect the coding parameters, and separate the beams using the coding parameters.

31. The antenna system of claim 30, wherein:
   the control signal for each antenna element comprises a beam component corresponding to each beam;
   the coding parameter for a corresponding beam is the same for each antenna element; and
   the beams are separated by detecting the coding parameters and combining the beam components from each antenna element having similar coding parameters.

32. The antenna system of claim 31, wherein:
   the control signal for each antenna element comprises an in-phase component defined by a sum of in-phase beam components for the corresponding antenna element and a quadrature component defined by a sum of quadrature beam components for the corresponding antenna element;
   the coding parameters are embedded into the in-phase and quadrature beam components, and
   the control signal for each antenna element comprises a total gain and a total phase shift for the antenna element based on the in-phase and quadrature components for the corresponding antenna element.

33. The antenna system of claim 32, wherein the coding parameter sets include orthogonal coding and frequency coding code sets.

34. In a beam former of the type for use with a phased array antenna system comprising multiple antenna elements, an improvement comprising:
   a beam former operative for receiving propagating energy at multiple antenna elements, setting control signals for forming the received energy into multiple beams, embedding coding parameters into the control signals, applying the encoded control signals to at least one phase and gain control device associated with each antenna element to form multiple encoded beams, combining the coded beams into a combined signal, and decoding the combined signal to separate the beams.

35. An antenna system comprising:
   a plurality of antenna elements;
   a beam former operative for setting control signals for forming the received energy into multiple separate beams, embedding coding parameters into the control signals, and applying the encoded control signals to at least one phase and gain control device associated with each antenna element to form multiple encoded beams;

a combiner for combining the multiple encoded beams into a combined signal; and a decoder for recovering the separate beams from the combined signal.

* * * * *